US006419340B1

(12) United States Patent
Wickham et al.

(10) Patent No.: US 6,419,340 B1
(45) Date of Patent: Jul. 16, 2002

(54) METHOD FOR AUTOMATICALLY FORMING INK AND MEDIA-DEPENDENT COLOR TRANSFORMS FOR DIVERSE COLORED INKS AND INK TYPES, VALIDATING COLOR GAMUT, AND APPLYING SAID INKS

(76) Inventors: Mark H. Wickham, 1004 St. Paul Ave., St. Paul, MN (US) 55116; Yuri A. Dreizin, 308 Turnpike Rd., Golden Valley, MN (US) 55416; Steven R. Jennen, #314, 8680 Marigold Cir., Eden Prairie, MN (US) 55344

( * ) Notice: Subject to any disclaimer, the term of this patent is extended or adjusted under 35 U.S.C. 154(b) by 0 days.

(21) Appl. No.: 09/260,925

(22) Filed: Mar. 2, 1999

(51) Int. Cl.[7] .......................... B41J 2/205; B41J 29/393
(52) U.S. Cl. ............................................. 347/15; 347/19
(58) Field of Search ............................. 347/19, 15, 43; 356/443, 444, 445

(56) References Cited

U.S. PATENT DOCUMENTS 5,451,990 A * 9/1995 Sorenson ...................... 347/19
5,781,206 A * 7/1998 Edge ............................. 347/19

* cited by examiner

Primary Examiner—John Barlow
Assistant Examiner—Juanita Stephens
(74) Attorney, Agent, or Firm—Carmody & Torrance LLP

(57) ABSTRACT

The method and apparatus of the present invention increases the color fidelity and precision for controlling a plurality of cartridges that emit an extremely wide variety of colored ink droplets from twelve (12) high resolution ink jet print cartridges, or pens, onto unique printing substrates during print operations in a large format digital print engine. The present invention provides an automated method of creating customized, ink and media-dependent color transforms to enable optimized printing operations. In the preferred embodiment, a charge coupled device (CCD) illuminated by an array of carefully chosen light emitting diodes (LED) is used to generate color coordinates of each of a plurality of colored patches printed on a printing substrate. The LED array provides a source of illumination upon a portion of a printed substrate within the field of view of a CCD/lens assembly that covers approximately the 400 to 700 nanometer wavelength of light (the "visible spectrum"). The LED array is used as a color sensor useful for revealing chromatic coordinates of inks in the print heads of the print engine, of printed patches that combine inks, and the maximum percent ink coverage of the media; thereby allowing the automatic creation of ink and media-dependent color transforms for the ink and media then-present on the print engine.

13 Claims, 21 Drawing Sheets

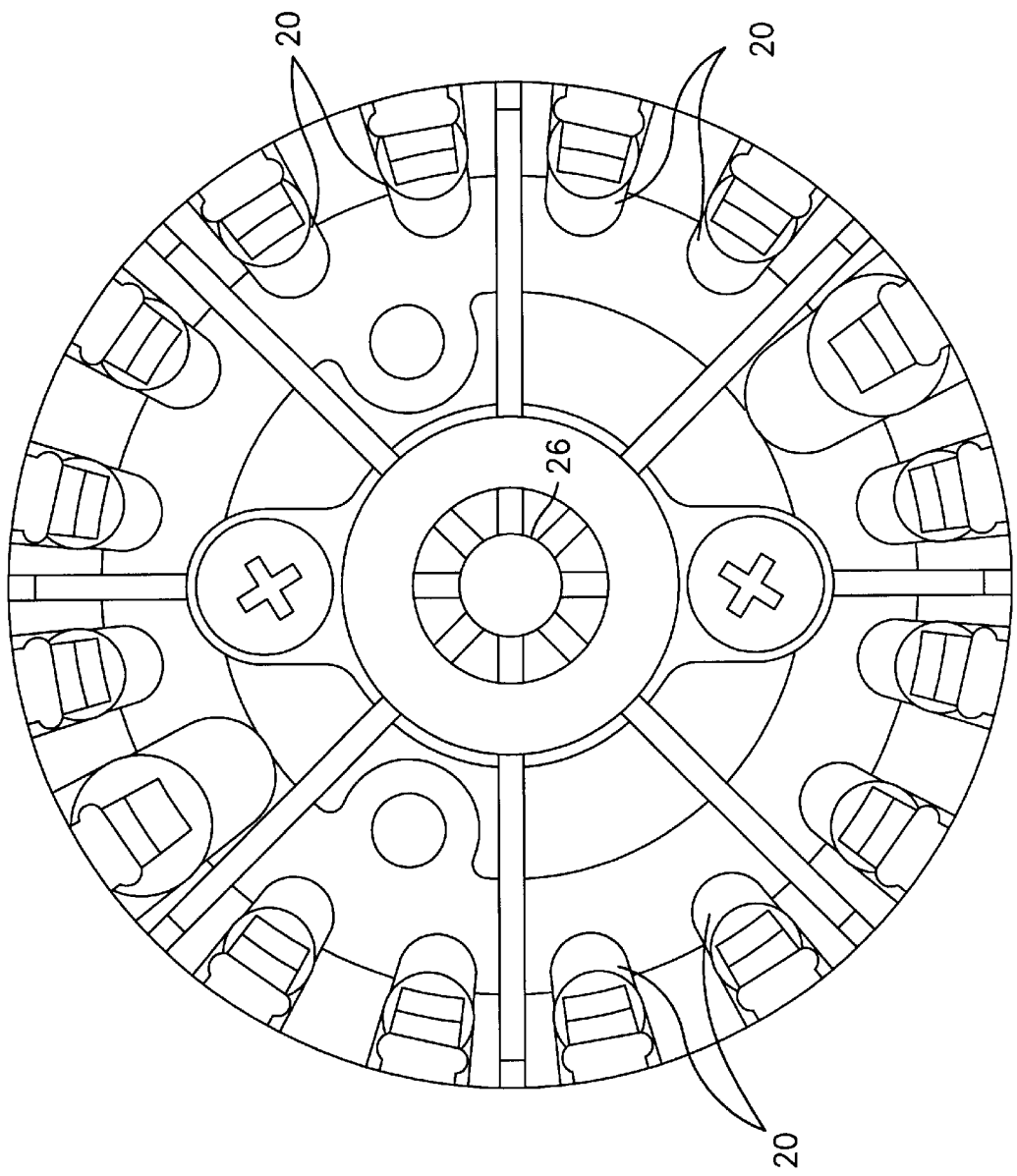

METHOD FOR AUTOMATICALLY FORMING INK AND MEDIA-DEPENDENT COLOR TRANSFORMS FOR DIVERSE COLORED INKS AND INK TYPES, VALIDATING COLOR GAMUT, AND APPLYING SAID INKS

FIELD OF THE INVENTION

The present invention relates generally to the field of non-impact printing and, in particular, the present invention reveals a method for automatically creating custom ink and media-dependent transforms so that a print engine operated under computer control is capable of autonomous operation by determining ink color and maximum percent ink coverage of a media (and therefore ink mixing ratios) and applying that knowledge to produce and 'sense' color values of a plurality of colored ink patches; a custom ink and media dependent transform is thus created using the 'sensed' color values of the patches and the transform is then used during printing operations to accurately expel a wide variety of ink colors from a plurality of print heads, at optimum percent ink coverage for a given media, in a large format full-color ink jet print engine.

BACKGROUND OF THE INVENTION

In the prior art related to ink jet printing a print head operated under precise electronic control typically opposes a portion of a printing media so that an image may be printed thereon. Typically, to achieve printed images of the highest quality each of a plurality of ink emitting elements that emit droplets of colorant onto the printing media need synchronization in respect of their position and orientation with respect to each other such element (i.e., exact "registration"). In prior art multi-head digital print engines including drum-based, swath (or carriage-based), and flat-bed digital print engines, it is known that consistency of mounting and operation of such elements increases the level of registration among said elements and thus decreases the likelihood of printing errors and image artifacts. In a traditional drum-based print engine a print media attaches to a rotating drum which then passes under one or more discrete ink emitting print elements ("nozzles") mounted on a carriage articulated in the axial direction. In a flat bed print engine, the printing media is rigidly coupled to a substantially planar surface and the nozzles are articulated in two dimensions to cover the media. In a reciprocating swath, or carriage-based, print engine the media is incrementally stepped over a platen surface in one direction while the nozzles reciprocate across the media in a direction orthogonal to direction the media advances. In many of these traditional print engines perfect registration has become even more difficult to efficiently achieve as the number of print heads and the number of ink emitting elements increase and service and replacement procedures become more frequent. Accordingly, in practical terms it is known that in some businesses specializing in producing full color digitally printed output, time constraints to complete printing jobs will conflict and oftentimes prevail with time required to complete full calibration and registration routines.

Accuracy of color reproduction in printing full-tone images using a plurality of ink heads emitting drops of colored inks on the printing substrate under computer control depends on numerous characteristics of the hardware/software train employed in the printing process, including those of the inks, substrate, ink heads, as well as on certain environmental characteristics such as humidity and temperature. Some of the factors substantially impacting color reproduction may vary significantly and may be volatile and hard to stabilize or characterize to the necessary degree. Because of this, to achieve good accuracy in color reproduction using computer controlled printing devices, it is necessary to measure chromatic characteristics of a large set of color patches printed with a given printing equipment, and to use these measurements as feedback to tune up the printing process. To diminish the number of patches that need to be measured, this process is often divided in two or more steps. Usually the measurements produced in the first step help select the optimal set of patches to be measured in the main step, while the measurements in the last step may help verify the quality of color reproduction. The measured data can then be used to produce the color profile (a family of lookup tables used to control the amount of ink necessary for the best possible color reproduction).

In the prior art, the entire procedure of getting a color profile, including printing the patches, transferring them to the measuring table, taking the measurements with a specialized colorimeter, and then processing measured data involved a number of manual steps and was known to be labor intensive and error prone. Therefore, in order to improve the actual accuracy of color printers it was highly desirable, if not required, to automate this procedure, expanding the color printing software to include the color measurements in the automated loop.

In the recent prior art, some of the leading-edge printers, in particular those used for wide format printing, have already been equipped with optical sensors such as CCD arrays used in digital cameras, in particular in machine vision applications. These optical sensors have been previously used to determine positional accuracy of graphical elements such as dots and lines, and were not intended to be used for color measurement purposes.

Thus, a need exists in the prior art to automate several previously unrelated steps toward creating specialized, custom color transforms which are ink and media dependent (and which also account for a majority of other factors that effect print quality, such as humidity/temperature conditions). Thus, a need exists in the art to provide customized, optimum printing of inks onto a large variety of printing substrates using optimized color transforms without resorting to additional equipment or manual steps to create such transforms. Further, a need exists in the art of digital ink jet printing to compensate for color image fidelity by revealing the actual chromatic characteristics of patches made up of individual colored dots and then creating custom color transforms that inherently include the actual color 'performance' of the inks on the media (which is often not a 'true' reference white) colored ink droplets in order to improve the quality and the visual clarity of text, graphics, and color appearing on the print media. Finally, a need exists in the art to improve the quality of output by automatically synchronizing ink and media printing components so that a plurality of colored ink droplets accurately record dots of desired color upon desired locations on the printing media to thus rapidly form high quality printed output closely resembling original source images.

SUMMARY OF THE INVENTION

The method and apparatus of the present invention increases the precision for controlling a plurality of cartridges that emit an extremely wide variety of colored ink droplets from several ink jet print cartridges in a digital print engine. The present invention addresses performance confirmation of individual nozzles and registration among each cartridge, and hence, each nozzle to each other nozzle, by utilizing a charge coupled device (CCD) and an array of carefully chosen light emitting diodes (LEDs) to create an optimal CCD sensor signal to quickly and accurately locate patterns of individual dots created by the droplets emitted from each of thousands of nozzles disposed in said print cartridges. The LED array provides a source of illumination upon a portion of a printed substrate within the field of view of a compact imaging subassembly which includes a CCD, a lens, and the plurality of LEDs which supply illuminating radiation from 400 to 700 nanometers wavelength (the "visible spectrum").

Thus, since the individual dots are of a wide variety of colors, LED operation preferably includes a control circuit that references a memory storage device which indicates the color of the ink in each cartridge. In the preferred embodiment, twelve (12) cartridges each having three hundred (300) ink emitting nozzles are disposed in a reciprocating carriage that traverses a printing zone of approximately four to six feet (4'-6') in length. Even assuming that not every nozzle is used during printing on the order of three thousand individual nozzles can emit as many as twelve different colors of ink. Manual registration or validation of nozzle performance, while possible, is clearly not a time or cost conscious alternative when handling such a large variety of inks expelled from so many individual cartridges.

A series of electronic images are recorded during said periodic illumination and each may be stored, compared to a corresponding series of reference dot patterns, then used for updating an electronic printing sequence, and/or viewed on a monitor to confirm orientation and location of the optical sensor with respect to individual dots. The electronic image is typically temporarily stored as a two dimensional bit map in a portion of a memory storage device that may include location, size, and color information of each individual dot interrogated and successfully detected by the optical sensor. The source of illumination may comprise many different colored source elements, such as red, green, blue (RGB) which taken in the aggregate preferably cover the entire visible spectrum.

The present invention thus finds increased utility over a variety of prior art printing methods and platforms to achieve accurate placement and registration among a plurality of different color ink droplets recorded on a variety of desired pre-selected locations of a printing media. By sensing dot patterns produced by one or more print head cartridges with a first print nozzle control sequence and then determining which of a variety of controlled parameters to adjust to improve registration first among nozzles of each cartridge with respect to each other and thereafter among nozzles of different cartridges. In a preferred embodiment of the present invention, a print engine employs several print heads that can readily provide nozzle redundancy so that mis-firing and non-firing nozzles may be compensated and replaced by fully operational nozzles without degradation of image or needless loss of available printing time. The initial steps of the inventive method herein preferably include conducting compensation calculations based upon the location of discrete colored dots recorded on the print media, which calculations are promptly implemented in an amended excitation control sequence prior to initiating later calibration steps so that successively finer tuning for dot placement accuracy results.

The present apparatus includes an optical sensor for sensing and storing information about dots recorded on a print media by said print heads wherein the optical sensor is preferably coupled to the carriage assembly, and based upon each of several iterative steps where differing calibration patterns are optically sensed, achieves highly accurate registration among the print heads.

One way to determine the color of a colored patch is to measure its reflectivity at a sufficient number of narrow wavebands spanning across the visible spectrum. This is usually done by comparing the amount of light reflected by a color patch with that reflected by a white patch. The comparison can be done using the values of electric signals generated by a photosensor such as a photodiode or CCD (which is an array of miniature photodiodes). One difficulty here is that the electric output of most inexpensive photosensors is not sufficiently linear (with respect to the energy of incoming light) to provide data with accuracy suitable for color measurements. Another difficulty lies in the fact that in reality, color swatches produced by the printer are just an assembly of separate or overlapping dots made by drops of just a few different inks. To extract reflectivity from CCD measurements, each CCD pixel output received with certain exposure time 't' can be first mapped to the exposure time 'T' that was required to get the same output in the white patch. The reflectivity 'R' then can be determined as a ratio of T/t averaged over CCD pixels, that is: $R = <T>/t$.

An exemplary carriage assembly, print head sockets and related mounting and electrical coupling of a preferred embodiment are fully described in U.S. Pat. No. 6,290,332 entitled "Carriage Assembly For A Large Format Ink Jet Print Engine," by Crystal, Gonier, and Barclay, the contents of which are incorporated herein by reference in their entirety.

The following figures are not drawn to scale and only detail a few representative embodiments of the present invention, more embodiments and equivalents of the representative embodiments depicted herein are easily ascertainable by persons of skill in the digital imaging arts, and are expressly covered hereby. The inventors reserve the right to augment or otherwise render any portion of the written description, and those aspects inherent therein and known to those of skill in the art, as illustration(s) hereof.

DESCRIPTION OF THE DRAWINGS

FIG. 5 is a plan view of a portion of the lower portion of the compact imaging subassembly depicting a preferred arrangement of sixteen visible light sources wherein each light source retained by a pliant finger feature of a mounting ring so that light sources direct light to an adjacent printing media to illuminate dots appearing thereon so that an optical lens which receives radiation on an imaging array.

DESCRIPTION OF PREFERRED EMBODIMENT

Figure 1A:
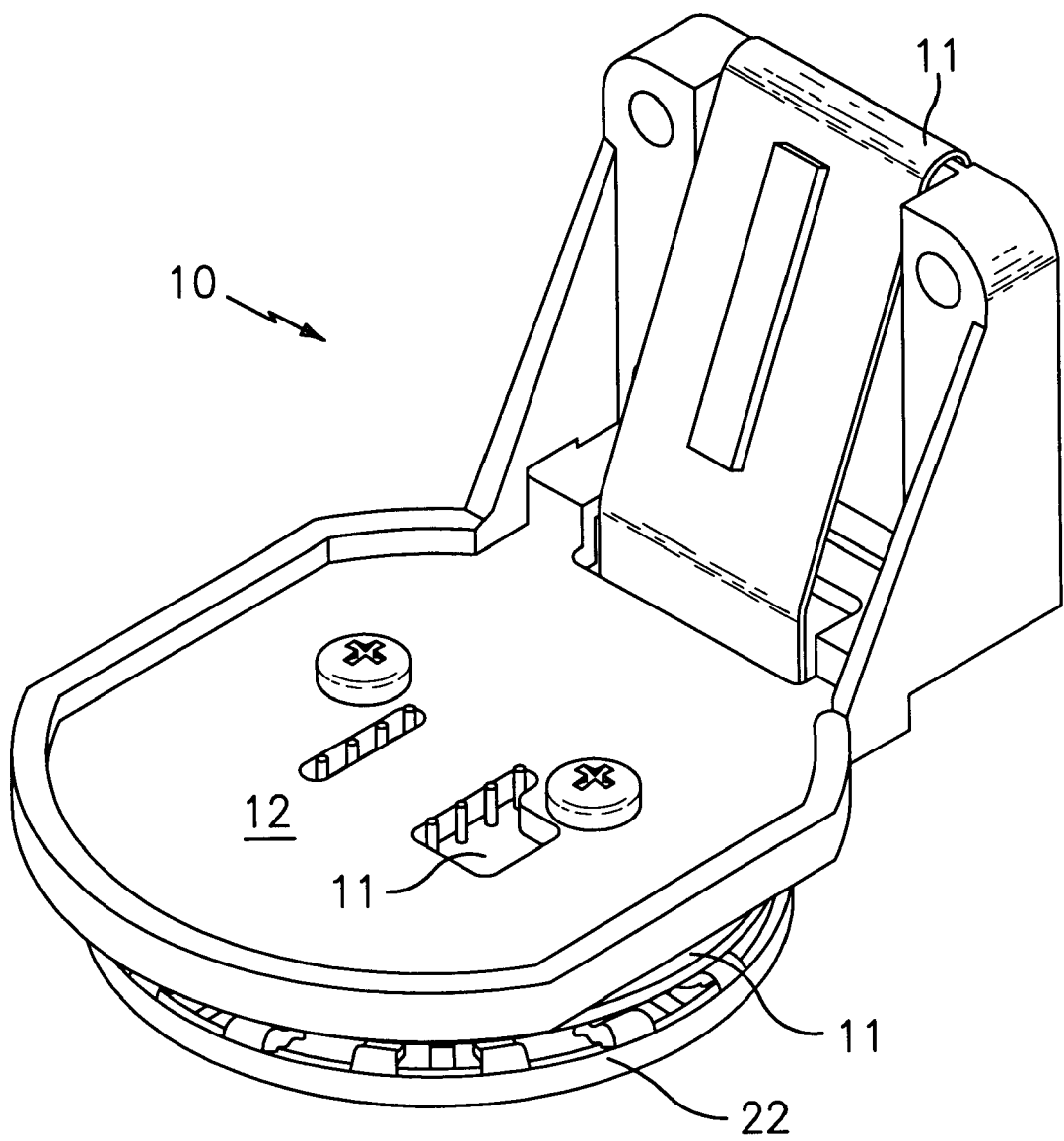
FIG. 1A is a perspective view depicting a preferred embodiment of the compact imaging subassembly of the present invention wherein an L-shaped base member, a flex circuit and a portion of a ring member used to support visible light sources so that they reflect the visible light to a centrally located imaging array.

The present invention encompasses an apparatus and iterative method of applying ink to a printing substrate and resolving chromatic coordinates of the ink upon said substrate so that a selection of color patches can be printed, resolved, and the color coordinates of the color patches used to create media and ink dependent color transforms. Thus, the method of the present invention requires only at least two print heads filled with ink that is emitted onto a printing substrate and a color sensor for resolving color information about the inks alone and in combination with other inks so that custom media and ink dependent color transforms can be created and used during printing. The method of the present invention improves the quality and versatility to the end user who, by practicing the present invention, can now precisely control a plurality of ink emitting elements operating in a print engine having multiple print heads.

As introduction to the preferred hardware platform for practicing the present invention, said hardware print engine and preferred sequences of practicing registration techniques and operating the print engine are first described hereinbelow. Thus, only a portion of the present written disclosure is solely directed to the present invention with the remainder supplying a detailed description of preferred hardware embodiments useful for automatically forming media and ink dependent color transforms with and for a large format ink jet print engine.

With respect to the registration issues and use of a camera for completing said registration, the following summary recital of information is presented to the reader and is followed with a more detailed description (with reference to Figures herein).

The preferred calibration pattern sequence involves first applying a solid area of dark colorant and leaving a similarly sized area adjacent media without colorant and then orienting an optical sensor to oppose said area and acquiring "whitepoint " and "blackpoint " output reference signals for each LED from said optical sensor to confirm the sensor components are electrically coupled together and operating effectively and for determining the CCD response to 'white' media in each LED. Next, a preferably cross-shaped homing mark is applied to the media and then acquired by the optical sensor with reference to an x-axis horizontal encoder signal and a y-axis media web signal acquired from media drive components. Then, two identical scaling dot pattern marks of known size and separation dimension is applied to the media and detected by the optical sensor so that (the size of) recorded dots can be correlated to an adjacent discrete pixel elements in the optical sensor (and thus allows derivation of ratio of CCD array pixels to each printer pixel). Then, a "fingerprint " pattern for each print head is applied to the media that comprises one dot recorded for each nozzle of each print head, all said dots being recorded in an area covered by the field of view of the optical sensor and all mis-firing, or non-accurate nozzles are identified and a corrective excitation sequence applied. Then a bi-directional pattern is applied and analyzed by the optical sensor and any variation in dot placement identified and corrective action applied. Then head-to-head registration patterns are applied to the media with reference to a single print head (which preferably emits dark colorant) and the dot patterns are identified for accuracy and corrective action is applied. Instead of periphery detection of dots, the inventors have implemented a detection process that utilizes synthesized correlation, or "reference" bitmap images, requires a certain level of correlation to an optically-sensed bitmap image in order to create a meaningful spike in the sensor signal. Preferably, a common specification is used to generate the reference bitmap and the driving signals for creating each of the printed calibration patterns.

During optical sensor operation, control electronics queries a memory structure which contains chromatic information about ink contained in each ink jet print head mounted in the reciprocating carriage assembly and then the control electronics selects an appropriate one or more LED to produce illumination having a wavelength which is complementary to the color of the ink in the operative ink jet print head (e.g., blue light promotes an optimum reflected radiation signal and therefore CCD response signal when illuminating yellow ink dots on the printing substrate). Thus, the LED instantly optimizes signal strength of the CCD with respect to the colorant emitted from the ink jet print head. This approach greatly enhances the ability to practically monitor performance of the thousands of individual ink emitting nozzles mounted in the preferred carriage assembly of the most preferred embodiment of the instant invention. From time to time very small dots, or poorly illuminated dots of lightest concentration of colorant, will fail to be detected by the optical sensor and the associated nozzle will be eliminated from further operation. The source of illumination serves another goal in that sufficient illumination assists in drowning out background sources of illumination which can create anomalous results. Preferably a very small aperture (proximate the lens) is used in focusing the illuminating radiation on the focal plane of the optical sensor to improve depth of field; thus, the brightest, and most accurate illumination sources are preferred in practicing the present invention. In practice a field of view of approximately eighty (80) imaging pixels by sixty (60) imaging pixels is used herein. A larger field of view will allow greater variety of registration procedures clearly covered hereby, whether or not described in detail as to said range or scope of field of view of said optical sensor.

The present invention is first described with reference to FIG. 1A and FIG. 1B in depicting enlarged perspective views of an optical sensor assembly 10 preferred by the inventors for implementing the invention taught, enabled, and fully disclosed herein. The assembly 10 includes base support member 12 for attaching the assembly 10 directly to a circuit board residing on a reciprocating carriage assembly (not shown). A number of illumination sources 20 are disposed on an annular surface 22 of a basket member 24 and oriented to produce illumination of a printing media opposing lens 26 which focuses the illumination energy onto a sensor array 100 disposed within the basket member 24 which is electrically coupled to memory storage 32, remote print cartridge control electronics 30, and optionally. The sources of illumination 20 are preferably light emitting diodes (LEDs) having precise emission spectral characteristics of known wavelength and intensity that possess distinct peak radiation at a unique wavelength while generating lower amplitude radiation which overlaps with other LEDs 20. In a preferred embodiment, eight LEDs selected for their aggregate coverage of illumination over the visible spectrum (e.g., 400 to 700 nanometer wavelength) selected in accordance with the above criteria possess the following peak illumination values (in nm wavelength): 430, 470, 500, 525, 560, 590, 622 and 660. In order to ensure proper illumination of the colored dots on a printing media a two sets of eight (8) LEDs are preferably arranged as depicted in FIG. 1B and FIG. 5.

Figure 2:
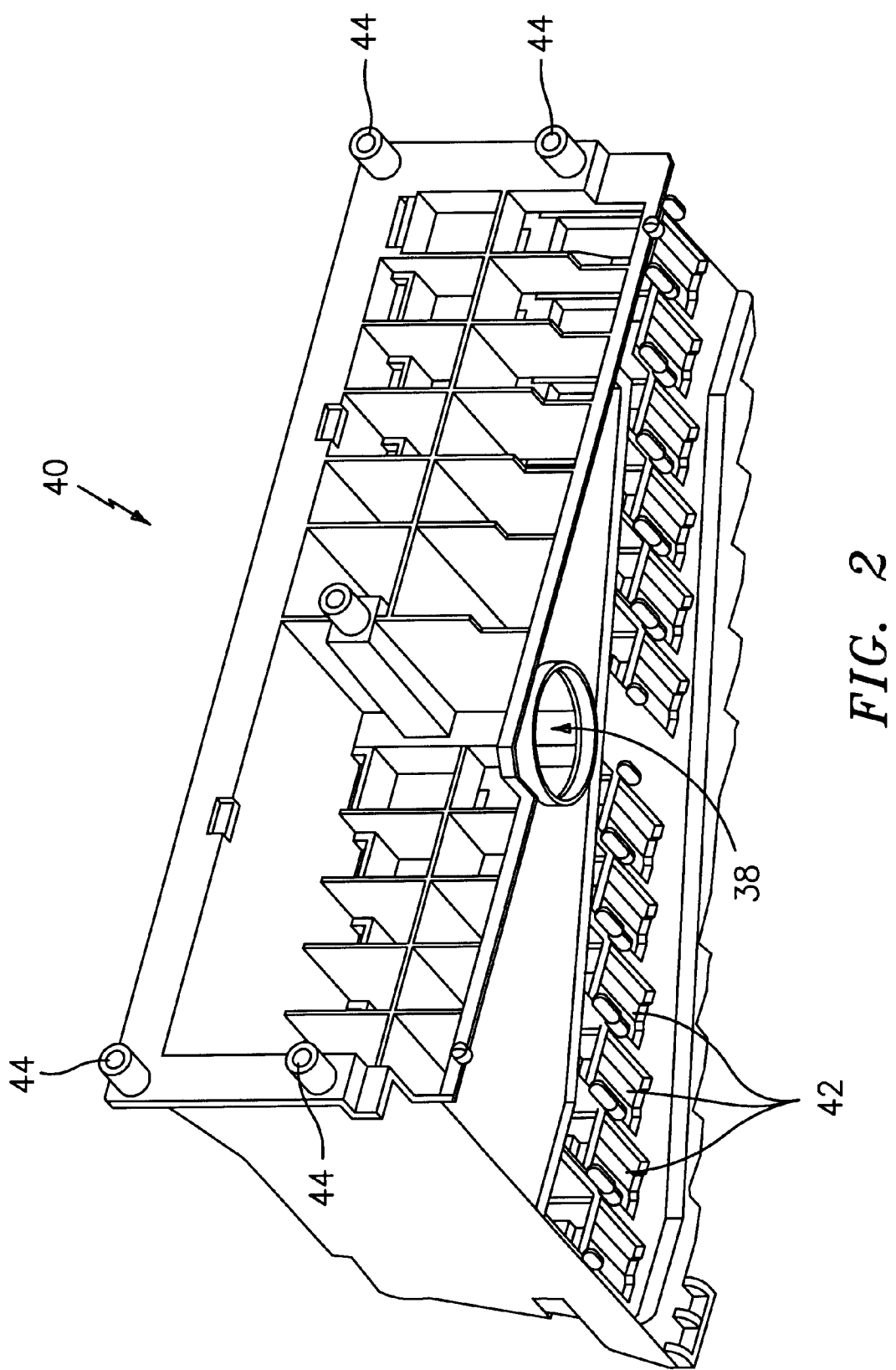
FIG. 2 is a perspective view of the lower portion of a carriage assembly having twelve (12) print head sockets for releasably retaining disposable ink jet pens therein and wherein the mounting location for the compact imaging subassembly of FIG. 1 is depicted.

Referring now to FIG. 2 a perspective view of a preferred carriage assembly 40 illustrating the receptacle 38 for retaining optical sensor assembly 10 and a plurality of stand-off circuit board mounting bosses 44 for connecting the carriage circuit board 30 to the carriage assembly 40. In the depicted embodiment twelve (12) sockets 42 for releasably retaining disposable ink jet print heads (not shown) are oriented to minimize the footprint of carriage assembly 40 so that when the twelve print heads are retained in sockets 42, an ink coverage area of each print head doesn't coincide with any other print head in the x-axis direction. Preferably the pens used in conjunction with the present invention are manufactured by Hewlett-Packard Company of Palo Alto, Calif., U.S.A. as the following models: 5164, "Hercules" or model number 1809A, and the C1806. The preferred positioning of optical sensor assembly 10 relative to the ink emitting nozzles of the print heads is easily appreciated from viewing at least FIG. 4 in combination with FIG. 2. The sensor assembly is received in receptacle 38 proximate and electrically coupled to the carriage assembly circuit board (not shown).

Figure 1B:
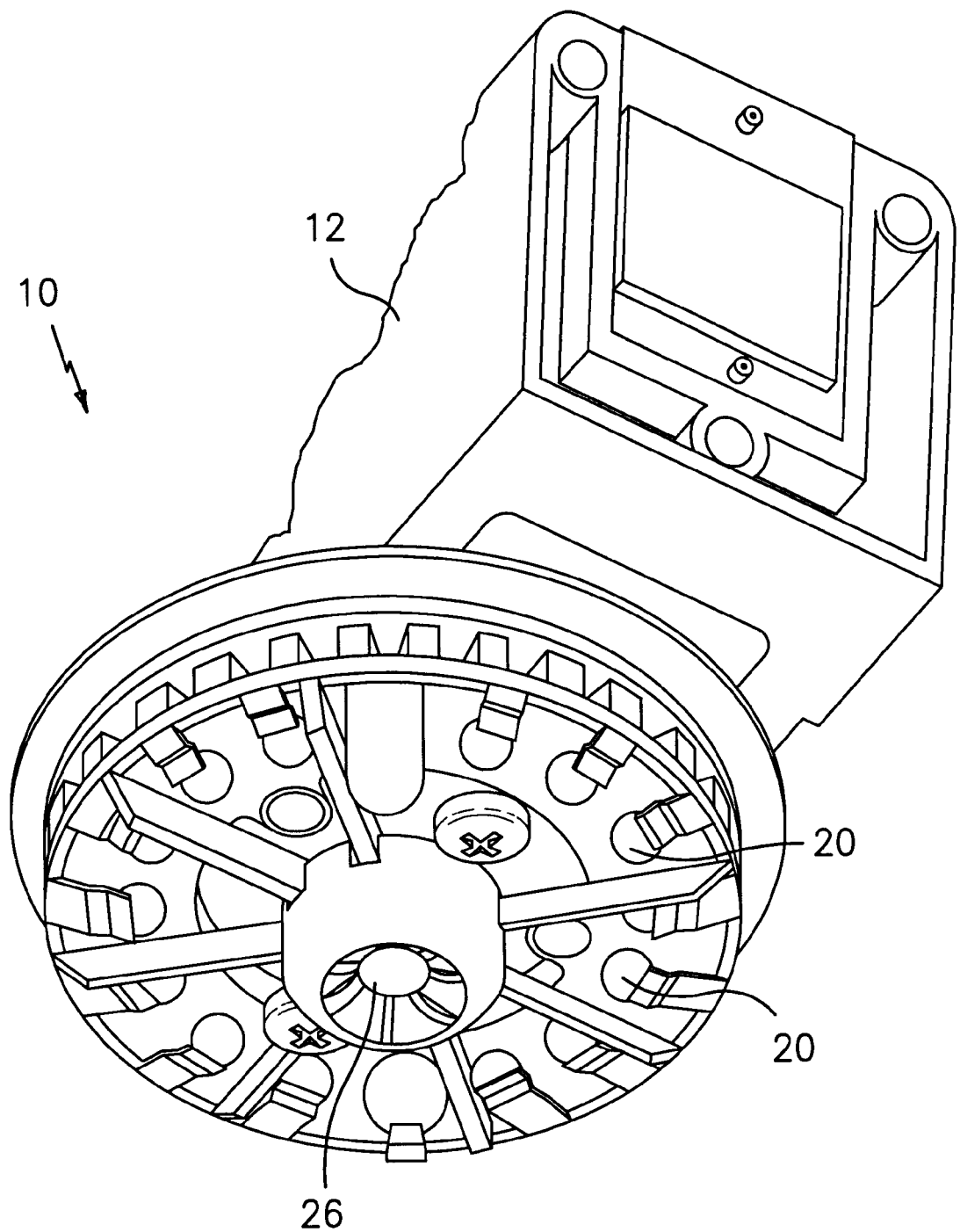
FIG. 1B is a lower perspective view depicting the preferred embodiment of the compact imaging subassembly of the present invention which was depicted in FIG. 1, wherein two flex circuit mounting posts, a mounting pad for promoting electrical contact with the flex circuit, the visible light source mounting ring which also supports a lens proximate an imaging array (not depicted).
Figure 3:
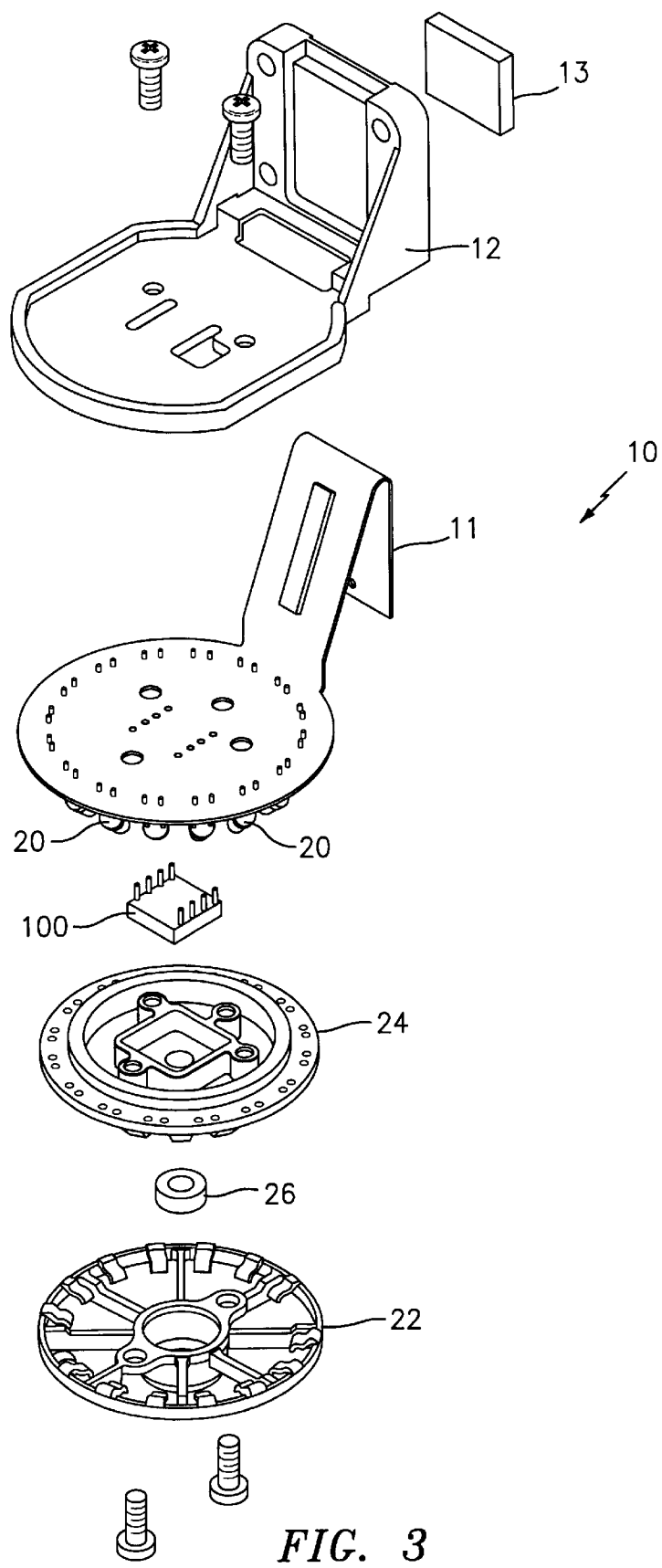
FIG. 3 is an exploded view of the components of the compact imaging subassembly depicted in FIGS. 1A, 1B and FIG. 2 and depicting each component of the subassembly.

Referring to FIG. 3, which is an exploded view of the components of the compact imaging subassembly depicted in FIGS. 1A, 1B and FIG. 2 that depicts each component of the subassembly so that the reader can appreciate the elegant simplicity of this embodiment. The flex circuit 11 couples to LEDs 20 and CCD 100 at one end and has a mass termination location for direct coupling to a circuit board 30 disposed on carriage 40. A flexible ring-shaped member 22 provides a biasing force to each LED 20 via elongate fingers that urge the LEDs into firm contact with a basket member 24, and member 22 also provides similar biasing force to retain a lens 26 into firm contact with a central mounting location on basket 24. An imaging array 100, herein "CCD" (charge coupled device), is disposed in a central socket that has a light admitting aperture for allowing reflected radiation to be transmitted through the lens 26 before the light reaches the CCD 100. The CCD 100 is electrically coupled to conductive traces on the one end of the flex circuit 11. The preferred attachment means are threaded screws designed to fasten this "CCD sandwich structure" from opposing sides of the subassembly 10. The flex circuit preferably has two apertures formed in the one end which correspond to mounting posts 15 formed in the upper mounting surface of the base member 12 and a rubber spacer pad 13 which promotes electrical contact between the mass termination of the flex circuit 11 and the circuit board (not shown) during assembly. The mounting posts 15 also keep the flex circuit and the rubber spacer pad 13 in place during manual handling.

Figure 4:
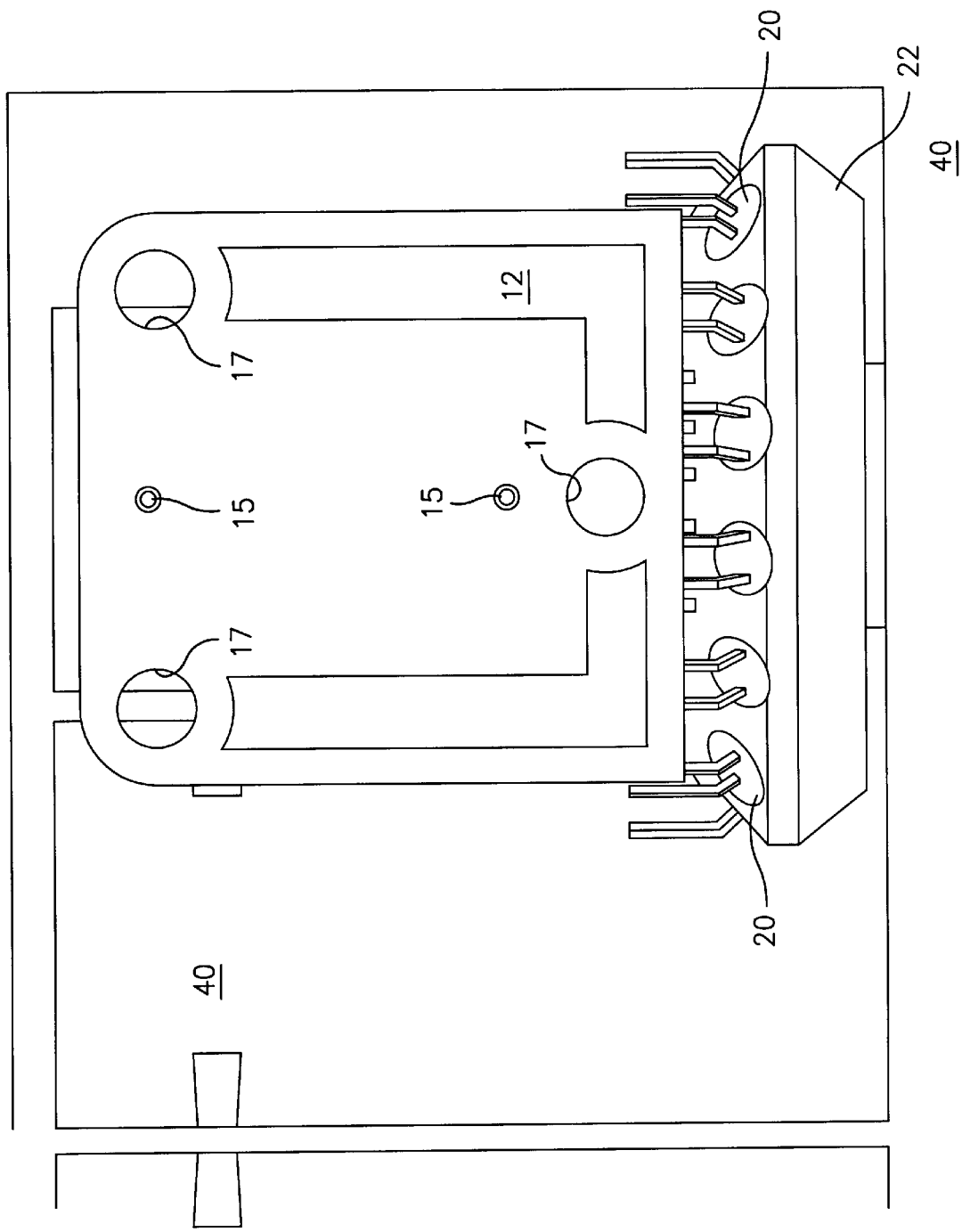
FIG. 4 is an elevational side view of a vertical mounting surface of an L-shaped base member in accordance with the present invention wherein the compact imaging subassembly is disposed in the mounting location of a carriage assembly.

Referring to FIG. 4, which is an enlarged elevational side view of a vertical mounting surface of an L-shaped base member in accordance with the present invention wherein the compact imaging subassembly is disposed in the mounting location of a carriage assembly, the aforementioned relation between the subassembly 10 and the receptacle 38 in carriage assembly 40 is shown. Further, the posts 15 and the rubber mounting pad 13 are shown (with the circuit board not depicted). Three (3) mounting ports 17 which receive threaded screws are preferred for attaching the subassembly 10 to the circuit board.

Referring now to FIG. 5, which is a plan view of a portion of the lower portion of the compact imaging subassembly depicting a preferred arrangement of sixteen visible light sources, or LEDs 20, wherein each LED 20 is retained by a pliant finger feature of a mounting ring 22 so that light sources 20 direct light to an adjacent printing media 48 to be reflected into an optical lens 26 which focuses the light on an imaging array, or CCD 100.

Figure 6A:
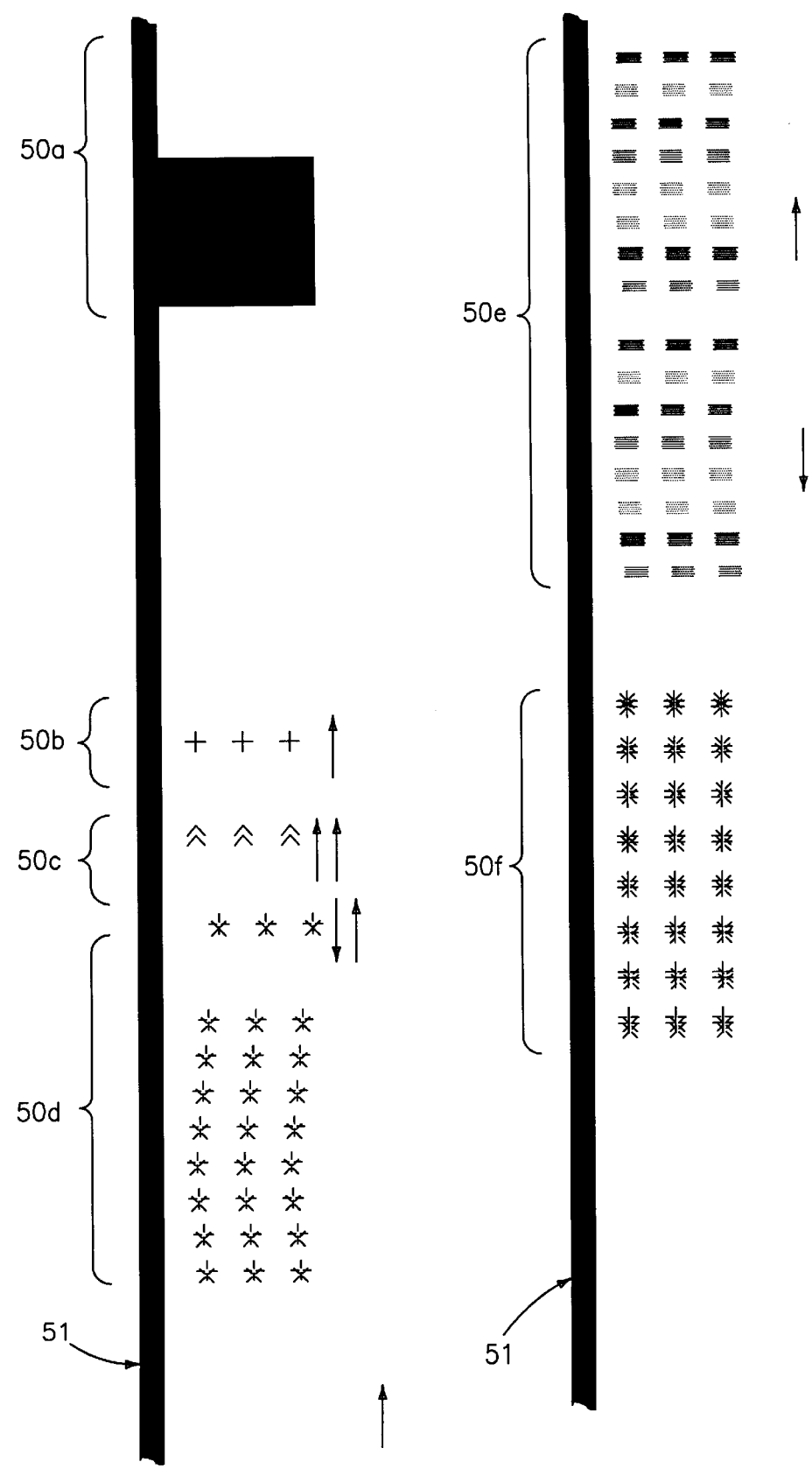
FIGS. 6A, 6B, and 6C depict a representative sample of set of calibration patterns preferably used in conjunction with the method and apparatus of the present invention.
Figure 6B:
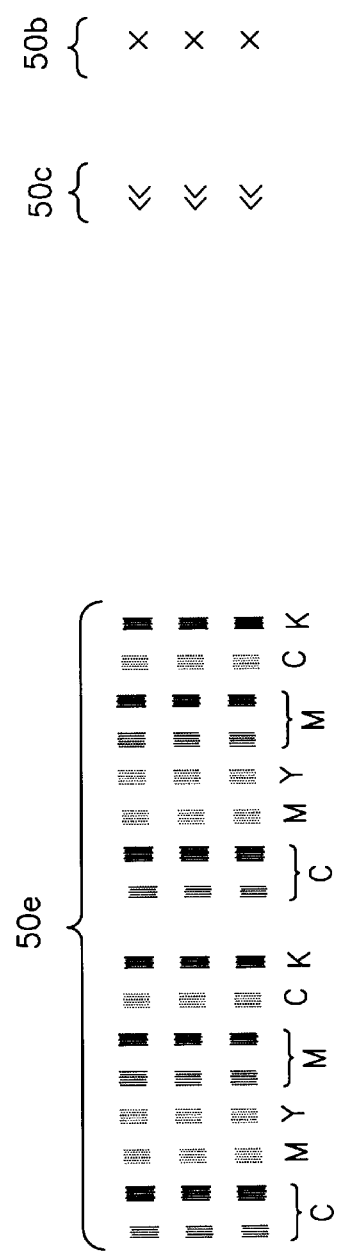
Figure 6C:
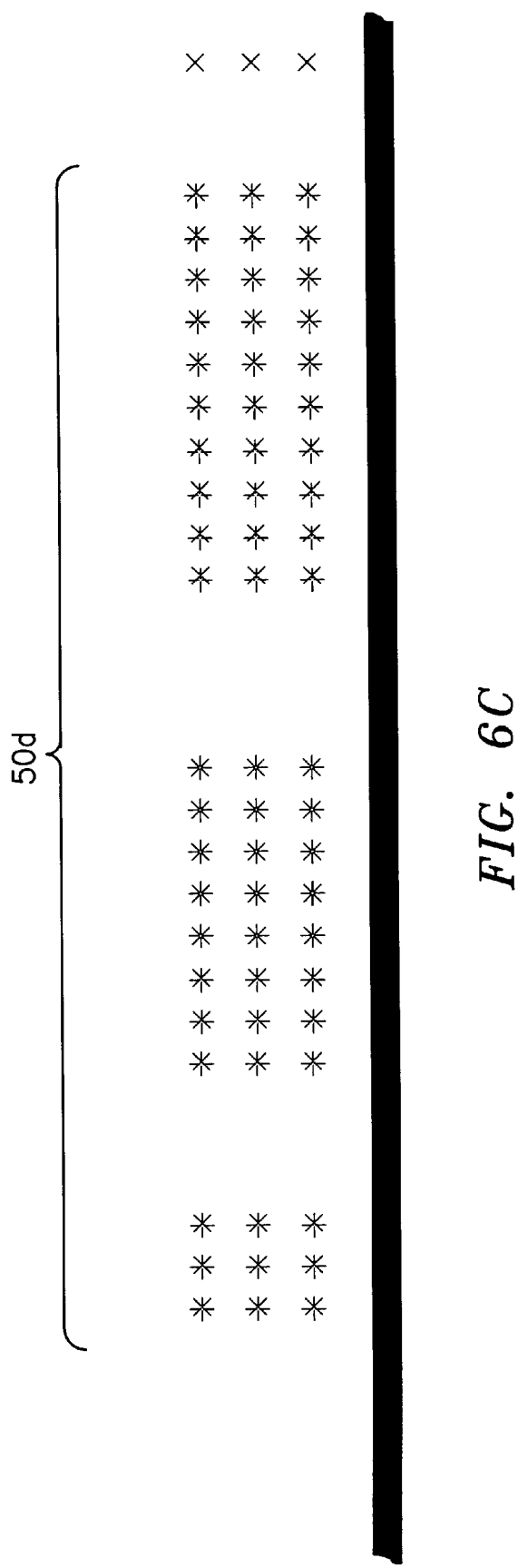

Referring to FIGS. 6A, 6B, and 6C, illustrating a representative sample of sets of calibration patterns preferably used in conjunction with the method and apparatus of the present invention and to iteratively perfect registration of the plurality of printing heads 43. These patterns are denoted by reference notation 50a–50f next to parentheses denoting each said pattern in FIGS. 6A, 6B, and 6C, and are preferably printed immediately prior to use, although as can be appreciated by one of skill in the art, the patterns 50a–50f may also be printed in a single composite pattern printing operation prior to initiating any of the sensing and registration compensation steps of the present invention (and either immediately inspected, or dried sufficiently and then inspected). In the event that all patterns 50a–50f are printed at more or less the same time, the sensing, processing, and compensating steps that take place in the preferred form of the invention are simply applied to each said pattern 50a–50f and thus, the patterns 50a–50f all share the same positional inaccuracy instead of the increasing precision typically found in the iterative process described in detail herein. While many variations of the patterns and marks depicted herein are possible, the fact that a single faulty or non-operational ink emitting nozzle 46 of a pen 43 can cause anomalous results if such single nozzle 46 is the only nozzle which supplies one or more of the linear dot segments depicted herein. Thus, while the "cross patterns" are depicted herein it is prudent to minimize use of horizontal linear dot segments to avoid the possibility that no dots will be received on the media 48. It should be clear that while less than twelve (12) sets of patterns are depicted herein, a print engine employing twelve (12) pens will require more sets of patterns than those depicted.

In any event, the present methods require a print engine print media handling capability that includes accurate means of determining carriage location in the x-axis (carriage axis) and y-axis (media web axis). The former is typically adequately provided with a linear encoder for most types of traditional printers and the latter typically involves use of a rotary encoder coupled to a media advance/drive motor means for both carriage-based and drum-based print engines, although a second linear encoder for a flat-bed is preferred. However, in a practical and efficient embodiment, the motor activation signals may be used, assuming of course that the motor responds accurately to commands for minute radial movement. For the linear encoder preferred herein, a linear encoder of a transparent, fairly rigid, and resinous material retained without tension or compression parallel to a printing platen is desired. To accomplish this end, a lateral edge portion the encoder should be coated with adhesive material on both sides and a resilient strip of elastic compound applied to form an encoder "sandwich." This encoder sandwich is then adhered to a rigid member spaced from and parallel to platen so that no tension or compression is imparted to the encoder. During print operations the carriage assembly 40 is preferably coupled to a drive belt which couples to a drive motor. A portion of the carriage assembly 40 is then preferably adapted to optically couple to the encoder to read the minute demarcations and electrically couple to carriage control electronics 30 and thus provide exceptional location accuracy in the x-axis direction.

For determining the location of the carriage assembly 40 (and thus print heads 43 and optical sensor 100) in the y-axis, the paper handling mechanism must prevent or account for media slippage and must be generally extremely accurate in forward and reverse drive and second, overall the amount of forward and reverse movement of the print media must be exactly ascertainable. A media drive motor incorporating a rotary encoder coupled to its drive shaft can provide an output readily applied for determining the amount of advance of the print media and when used in conjunction with the linear encoder, allows an accurate determination of the location of the carriage assembly 40 with respect to print media can be made. However, in an efficient implementation, the inventors simply utilize the drive signal sent to the media drive motor coupled to a take-up spool that receives the print media after the media traverses a preferably vented, vacuum-source driven platen during printing operations. Although this drive signal does not account or compensate for slippage of media, for most applications, the drive signal to motor adds negligible error. To allow for accurate reverse operation, removal of slack in the media web is accomplished with motion control of the paper handling subassembly. Preferably, a low torque axial motor coupled to the supply spool of media constantly urges media to return to said supply spool and thereby reduces media slippage, increases uniform media contact across vented vacuum platen, and helps reduce unwanted "walking" of media back and forth across the platen and the take-up spool. To further reduce such unwanted walking, additional apertures are formed in the platen along edges of various width media used for printing operations in print engine. As can be appreciated, the optical sensor 100 utilizes these x-axis and y-axis location signals to determine precise location of the cartridges 43 with respect to print media.

The first pattern to be subject to interrogation by the optical sensor 100 is pattern 50a of FIG. 6A which consists of two relatively large printed target areas, a first area printed at full converge with black, or other darkest available colorant, and a second reference area that typically remains un-printed. The first and second areas define the blackpoint and the whitepoint, respectively, used for initial calibration of the optical sensor 100. After pattern 50a has been printed the media advance mechanism is reversed so that the optical sensor 100 opposes the general location of the first the whitepoint and then the sensor 100 scans to sense the whitepoint and blackpoint areas with a satisfactory signal magnitude/strength and then said sensor 100 stores said whitepoint and blackpoint signal magnitude values, and location of said areas, for later reference. The sensor 100 first uses the location information used for originally printing the patterns 50a, and if no success occurs within a predefined time limit, the sensor 100 enters a scan mode, whereby the sensor 100 begins from the bottom (of the set of three sets of patterns 50a–50f) and scans back and forth as the media rewinds until the pattern 50a is acquired. The term "acquired" is intended to apply most readily to a condition whereby an output signal from sensor 100 spikes to near the top of its signal range when a reference bitmap pattern compares favorably with the then-present sensor-acquired bitmap image from sample and hold circuit 110. For the initial pattern 50a, any adjacent areas of black and white can be adequately acquired and the signals compared to confirm operational range of sensor 100—the primary object in using pattern 50*a*. This scanning mode can be implemented in a variety of ways, including use of the long solid border line 51 in initiating confirmation of sensor operation, as long as the line 51 is adjacent white space on the media, actual acquisition of pattern 50*a* by sensor 100 may be unnecessary.

The second pattern to be subject to interrogation by the optical sensor 100 is a pattern denoted 50*b* of FIG. 6A, which is a sensor homing pattern, and which is preferably printed in a single direction pass of carriage assembly 40, must be detected by the optical sensor 100. In order to locate the homing mark pattern 50*b*, the carriage assembly is articulated to the coordinates where the homing mark pattern 50*b* was printed, and if needed the just described scanning procedures implemented in both the x-axis and y-axis until satisfactory detection of said homing mark pattern 50*b* has been accomplished by successful comparison (and positive correlation) to a reference bitmap image of a reference homing mark created from the same specification used to print the homing mark pattern 50*b* upon the media.

Figure 11:
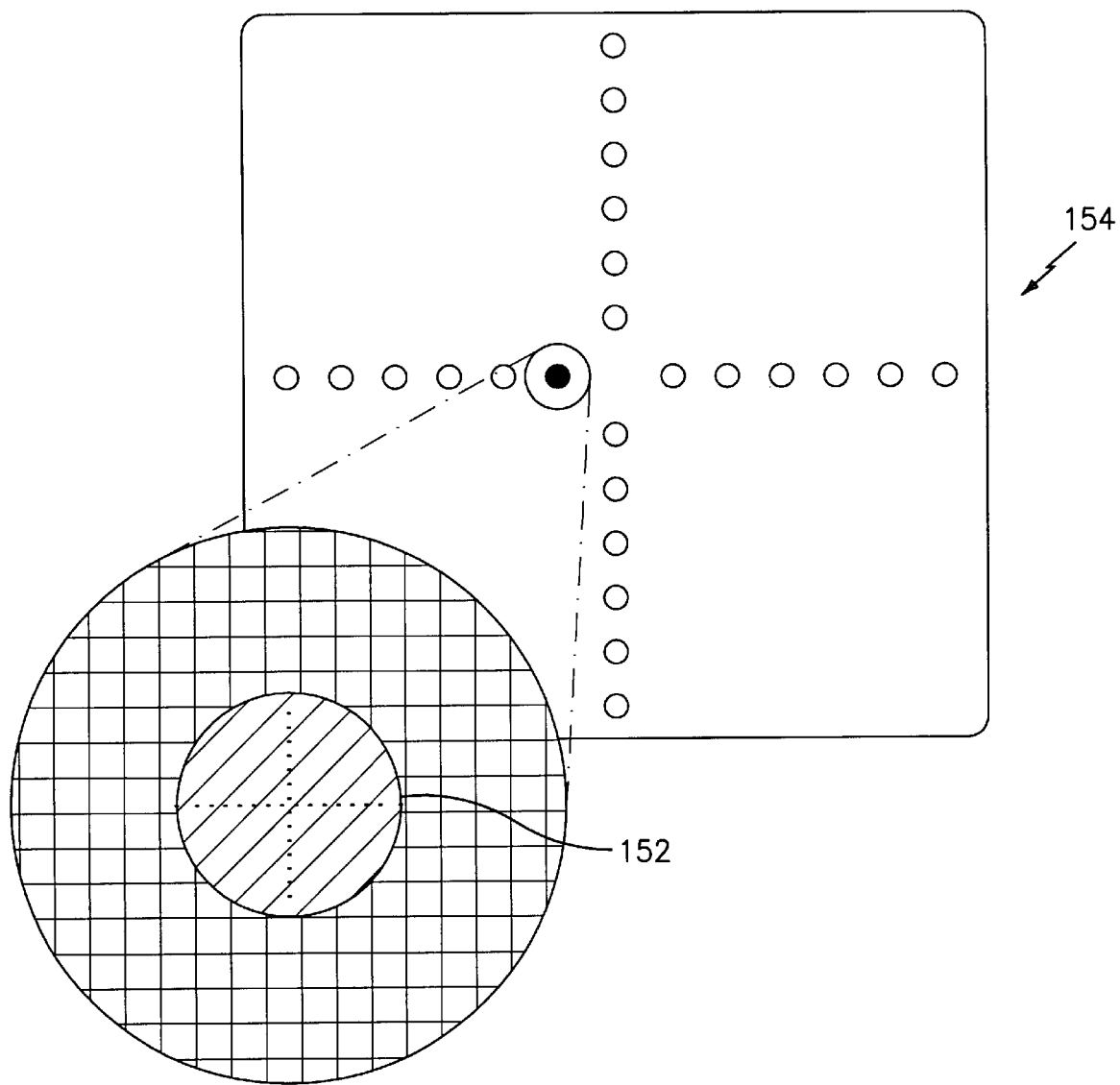
FIG. 11 is a plan view of a bitmap image of a representative pattern sensed with a linear or two dimensional array optical sensor and includes a partial enlarged view of a portion of said media showing a single dot of colorant recorded across several pixels of the optical sensor.

The third pattern to be subject to interrogation by the optical sensor 100 is a pattern denoted 50*c* of FIG. 6A, which is termed a "scaling pattern." Scaling pattern 50*c* is preferably printed in a single unidirectional pass of carriage assembly 40 over print media and consists of two identically shaped dot patterns, each printed with the same set(s) of ink emitting nozzles and having a pre-selected precise separation distance between the two identically shaped dot scaling patterns 50*c*. When the optical sensor 100 correlates to pattern 50*c* by positive comparison to an image reference bitmap of said pattern 50*c* (as produced by commonly specified data), an immediate correlation of separation, or camera pixel to printer pixel ratio becomes available. A scaling factor is generated as a result of this step of the registration procedure where the number of pixels present in the optical sensor can be accurately related to an expected, or typical-sized dots recorded to create a first of two identical sets of dot pattern upon printing media, each having the pre-selected separation from the other set of identical dot patterns. For example, a first dot pattern sensed by the optical sensor 100 may produce an appreciable signal from the optical sensor 100 due to the presence of a number of discrete dots of colorant on the printing media that measures approximately six or seven imaging pixels of the sensor 100 in diameter as seen in FIG. 11.

Once the scaling factor has been obtained, a testing of each ink emitting nozzle of each print head is conducted, as illustrated by pattern 50*e*. This pattern 50*e* is denoted the "fingerprint" pattern because every ink emitting nozzle receives an excitation sequence to emit ink over a relatively tiny portion of the print media. This pattern 50*e* was selected to provide optimum results regarding non-firing, mis-firing, and mis-directed ink emitting nozzles and is designed to maximize distance between pixels fired from each orifice. The pattern 50*e* comprises a single discrete dot of colorant for each nozzle separated adequately to provide a relative noiseless, or clean, bitmap signal from the optical sensor 100. A variety of similar patterns 50*e* are therefore easily determined and rendered and are implicitly covered hereby. Since each print head 43 should typically possess performance characteristics identical in all respects to all other print heads 43 (except for color) the sensed bitmap of image data regarding the dots of colorant can be compared to known, acceptable standards for dot placement from a fault-free stationary print head. To the extent that one or more dots fails to appear or is too faint to be adequately sensed by optical sensor 100 the corresponding ink emitting nozzle is turned off, and a replacement ink emitting nozzle mapped in a different pass across the pixel position to provide coverage in lieu of the original print head nozzle. Any pixels that are a pixel or more above or below the expected position can be used to fill in the closest row where they land, or mapped out, or permitted to impinge upon the media. Pixels that erroneously appear in the x-direction may be energized earlier or later than originally emitted via computer control so that they land in the desired pixel position.

Next, a pattern 50*d* useful for detecting the common, repeatable positional error(s) due simply to bi-directional scanning of the carriage assembly 40 during printing operations is applied to the print media. This error arises primarily as a result of the velocity imparted to the ink droplets due to motion of carriage assembly 40. In the present invention these errors are identified by the magnitude of positional error, or separation, between each of at least two ink droplets printed on a bi-directional printing scan during separate passes of the carriage assembly 40. Compensation for such bi-directional dot position errors involves simply modifying the timing of the excitation sequence for said dots so that each records upon the media at a position centered between the location of the two calibration dots. For this pattern 50*d* each ink emitting nozzle of each print head 43 prints complementary patterns on each of two successive passes over the printing media so that the resulting monochromatic pattern reveals timing and dot placement discrepancies between a first pass of carriage assembly 40 and a second pass in the opposite direction. The inventors prefer use of a "plus" sign on one pass and an overlapping cross symbol for the second pass, although other suitable patterns will reveal these bi-directional printing errors just as readily. Upon inspection by the optical sensor 100, variation in placement of discrete dots will be revealed, again, in comparison to a reference bitmap synthesized from common source data used to print the pattern 50*d*. To the extent that such variation in placement occurs in the x-axis direction they are correctable by simple temporal adjustment of the excitation sequence for that particular nozzle. Pursuant to the teaching of the present invention a y-axis variation is preferably treated by modifying the scan line in which the nozzle excitation sequence causes colorant to record on the media. This extreme example was produced in an effort to adequately compensate for an extremely warped platen member. To the extent that a greater variation occurs in the y-axis direction (and was not earlier detected and corrected or eliminated in the during the fingerprint pattern) it is recommended that the offending cartridge simply be re-sented if possible prior to further operation and/or an appropriate reserve cartridge be identified and mapped to emit ink in lieu of the mis-firing, or non-firing, ink emitting nozzles of the first cartridge during subsequent printing operations. At the completion of this step each of the ink emitting nozzles of each of the print heads 43 operating in the print engine should be in tune with other nozzles of the same print head, but not necessarily with other nozzles of other print heads operating in the print engine.

Thus, the final pattern of a preferred sequence of the present invention is the one identified as pattern 50*f*. Pattern 50*f* was selected to provide a common operating reference point for each of the print heads 43 in this head-to-head calibration pattern. The inventors prefer to utilize the black (K) as the reference point, although other colorant may be selected. Accordingly, a black "cross" (X) mark is applied to the print media for each print head operating in the print engine (including the print head printing the reference colorant). Then, each print head attempts to create a corresponding "plus" (+) having a common center location with the cross mark. Then, each of these composite marks are inspected by optical sensor 100 and any offset recorded in memory and transferred to appropriate control circuitry to influence printing locations of such offset dots. If the offset appears as a y-axis offset, the print head that prints a pattern that lags the other can preferably be compensated by moving all excitation sequences for said lagging print head to an earlier scan line for printing. Although a single faulty or non-firing nozzle can wreak havoc if said nozzle was to have printed a horizontal segment of dots as described elsewhere herein.

Figure 7:
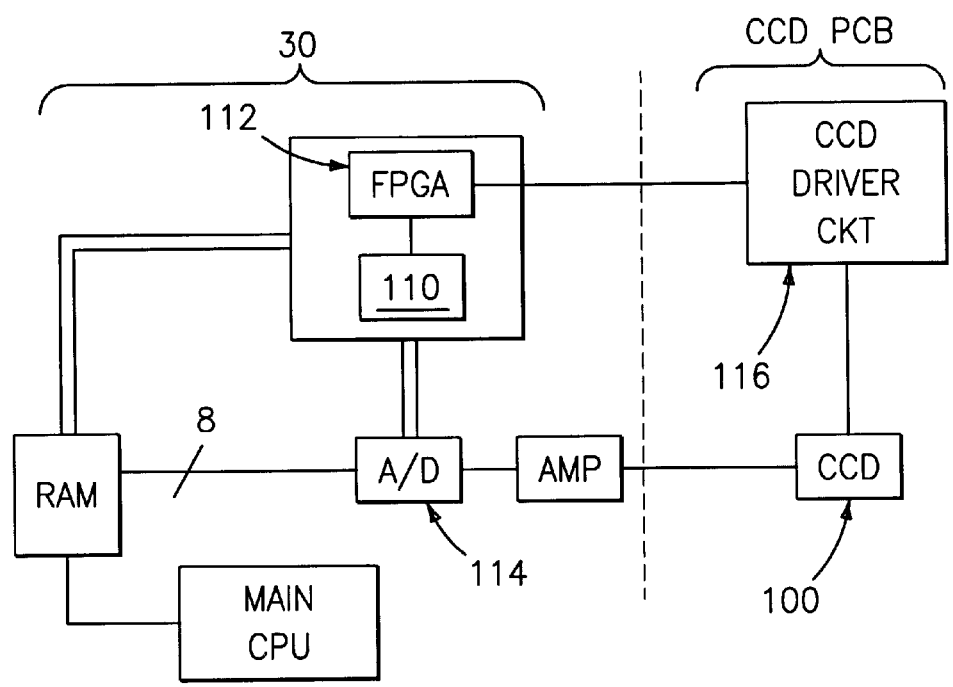
FIG. 7 is functional flow diagram depicting the major operations of a preferred embodiment of the present invention.

FIG. 7 is functional flow diagram depicting the major operations of a preferred embodiment of the present invention. The optical sensor 100 is electrically coupled to an appropriate driver 116 for the optical sensor 100, which in turn is electrically coupled to a sample and hold circuit (preferably designed for CCD imagers) 110, which in turn is coupled to a field programmable gate array (FPGA) 112, and analog to digital (A/D) converter 114. As can be appreciated, use of existing electronic circuitry increase the likelihood of obtaining successful results without undue experimentation. To this end, the inventors identify circuit elements so use in a preferred embodiment of the present invention. The sample and hold circuit 110 is supplied by Texas Instruments Incorporated as part number TL1591 which is a monolithic integrated sample and hold circuit using BiFET process with Schottky-barrier diodes and designed for use with CCD area imagers. A very fast input buffer amplifier, a digital-controlled diode-bridge switch, and a high-impedance output buffer amplifier are incorporated into a conventional dual-in-line package having eight pins. The electronic switch is controlled by an LS-TT1-compatible logic input. The driver circuit 116 selected for use with the optical sensor 100 of the preferred embodiment also is supplied by Texas Instruments Incorporated as part number TMC57253. This driver circuit 116 is a monolithic CMOS integrated circuit designed to drive image-area gates, anti-blooming gate, storage area gate and serial register gate of the sensor 100 (T1 Part No. TC255 CCD image sensor).

Figure 8:
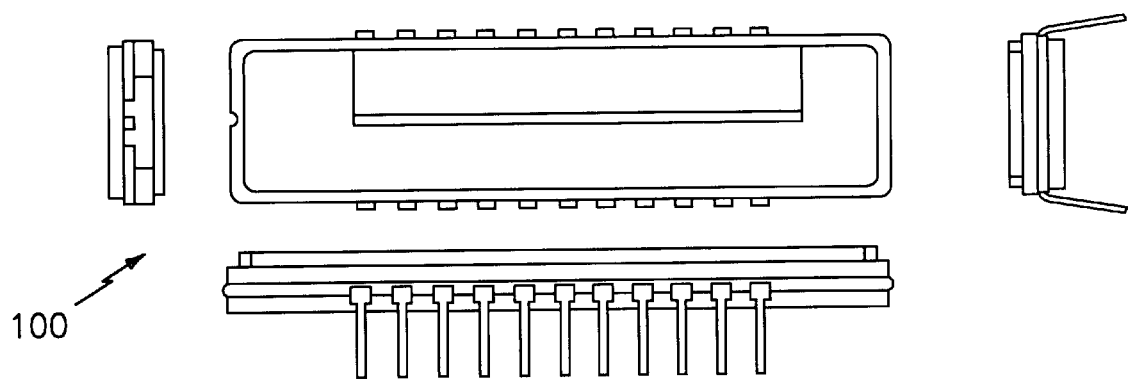
FIG. 8 is a series of three packaging diagrams of a suitable linear CCD array package useful in one embodiment of the present invention.
Figure 9:
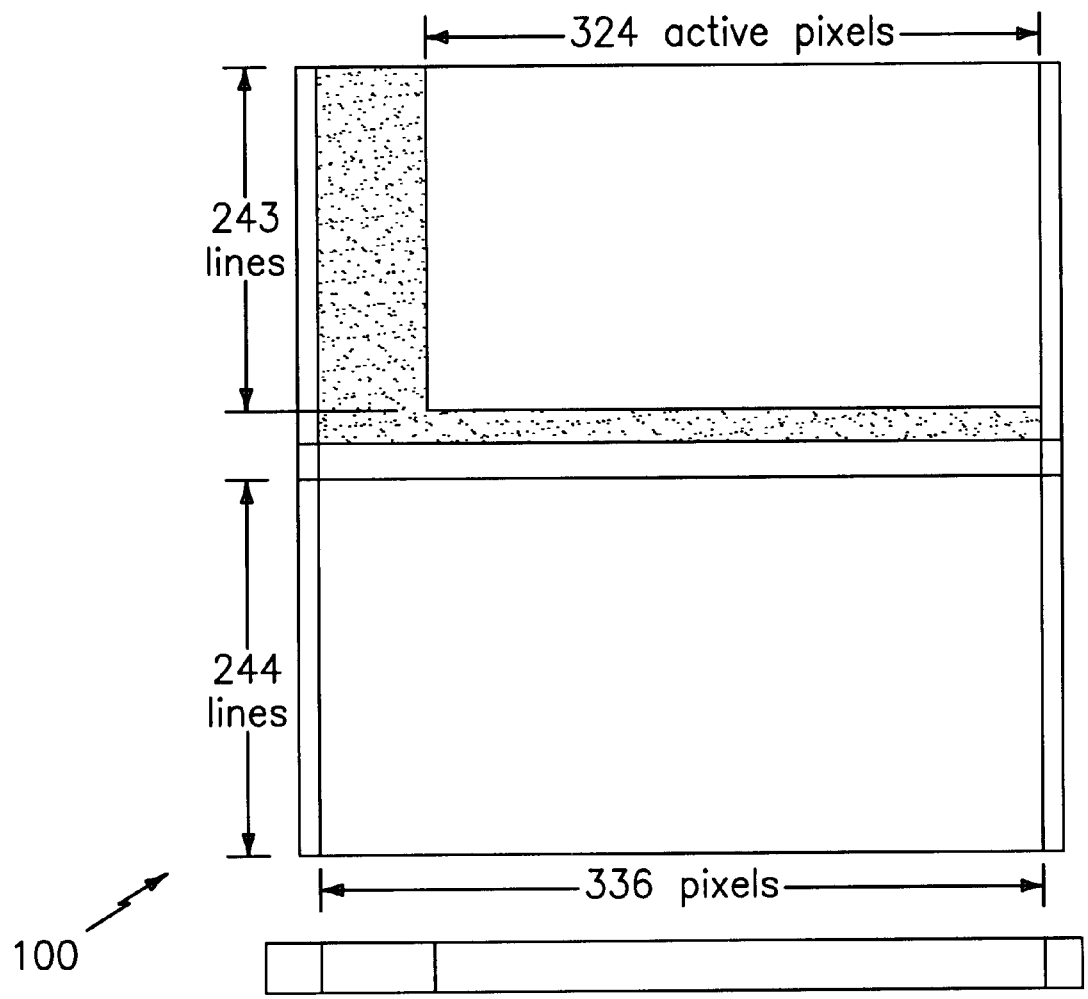
FIG. 9 is a series of three packaging diagrams of a suitable two dimensional CCD array package useful in one embodiment of the present invention

In FIG. 8 and FIG. 9, two commercially available articles suitable for use as the sensor 100 in accord with the teaching of the present invention are depicted. The only material difference between the two arrays is that one is linear array and the other a two dimensional array. In choosing a sensor 100 for color printing operations, it is important to ascertain the sensitivity of the sensor in the desired colors of the visual spectrum. In this respect, the inventors believe that an appropriate sensor 100 must operate rapidly and efficiently with limited illumination, and have sufficient response in the blue region of the visual spectrum in order to operate effectively in conjunction with the present invention.

Referring now to FIG. 8, a suitable linear (single dimensional array) optical sensor 100 is depicted in three views. The particular sensor 100 depicted in FIG. 8 is preferred by the inventors for use in conjunction with the present invention and is supplied by Sony Corporation, of Japan, under part number ILX503A, which is a reduction type charge-coupled device (CCD) linear sensor originally intended for facsimile, image scanner, and OCR use. This sensor 100 contains 2048 sensing pixels in a light weight and relatively low cost package. Extensive additional detailed technical information regarding sensor 100 is available from the supplier, and other similar sensors, such as part number ILX505A 2592 pixel CCD linear Image Sensor also supplied by the Sony Corporation, should operate satisfactorily in conjunction with the present invention. Note that when using a linear sensing array in conjunction with the instant invention, a scanning procedure must instituted in order to generate the two dimensional sensed bitmap image of the dot patterns rendered upon the print media.

Referring now to FIG. 9, a suitable two dimensional array optical sensor 100 appropriate for use in conjunction with the present invention is depicted in three views. The package for this sensor array 100 consists of a plastic base 102, a glass window 104, and eight conductor frame 106. The glass window 104 is sealed to the package by an epoxy adhesive and the eight conductors are configured in a standard dual in-line configuration and each conductor fits into a corresponding mounting aperture having 0.1 inch center-to-center spacing. The particular sensor 100 depicted in FIG. 9 and preferred by the inventors is supplied by Texas Instruments Incorporated, of Dallas, Tex., USA under part number TC255P frame-transfer charge-coupled device (CCD). Extensive detailed technical information regarding sensor 100 is available from the supplier and the inventors believe that other suitable sensors should operate satisfactorily in conjunction with the present invention. However, the following information is intended to inform the reader regarding representative details regarding sensor 100. In its two dimensional array embodiment, sensor 100 preferably contains 243 active sensing lines of 336 active sensing pixel elements each (with each pixel ten microns square) in a four millimeter (diagonal) image sensing area and was designed for use in black and white television and special purpose applications, such as taught by the present invention herein, where low cost and small size are desired. Twelve pixels are provided in each line for dark reference. One valuable performance aspect of the sensor 100 is its high-speed image transfer capability. A charge is converted into signal voltage with a twelve microvolt per electron conversion factor by a high-performance charge-detection structure with built-in automatic reset and a voltage reference generator. The signal is buffered by a low-noise two-stage source-follower amplifier to provide high output drive capability. The sensor 100 is manufactured using a proprietary virtual-phase technology, which provides the sensor 100 with high response in the region of the visual spectrum perceived as the color blue—an important feature for use in conjunction with the present invention. In operation, following exposure to incident radiation, image area charge packets are transferred through an image clear line to a temporary memory storage area. The stored charge is then transferred line by line into a serial register for readout. A buffer amplifier converts detected charge into a video signal. As charge is transferred into a pixel detection node the electrical potential of said node changes in proportion to the amount of signal received. The change is sensed by an CMOS transistor and (after proper buffering) the signal is supplied to an output terminal of the image sensor. After the change in electrical potential is sensed, the node is reset to a reference voltage supplied by an on-chip reference voltage generator. This reset is accomplished by a reset gate that is connected internally to a serial register. The detection node and the buffer amplifier are located a short distance from the edges of the storage area; therefore, two dummy pixels are used to span the short distance. The output signal of the sensor 100 is 60 mV (+/−10 mV).

Figure 10:
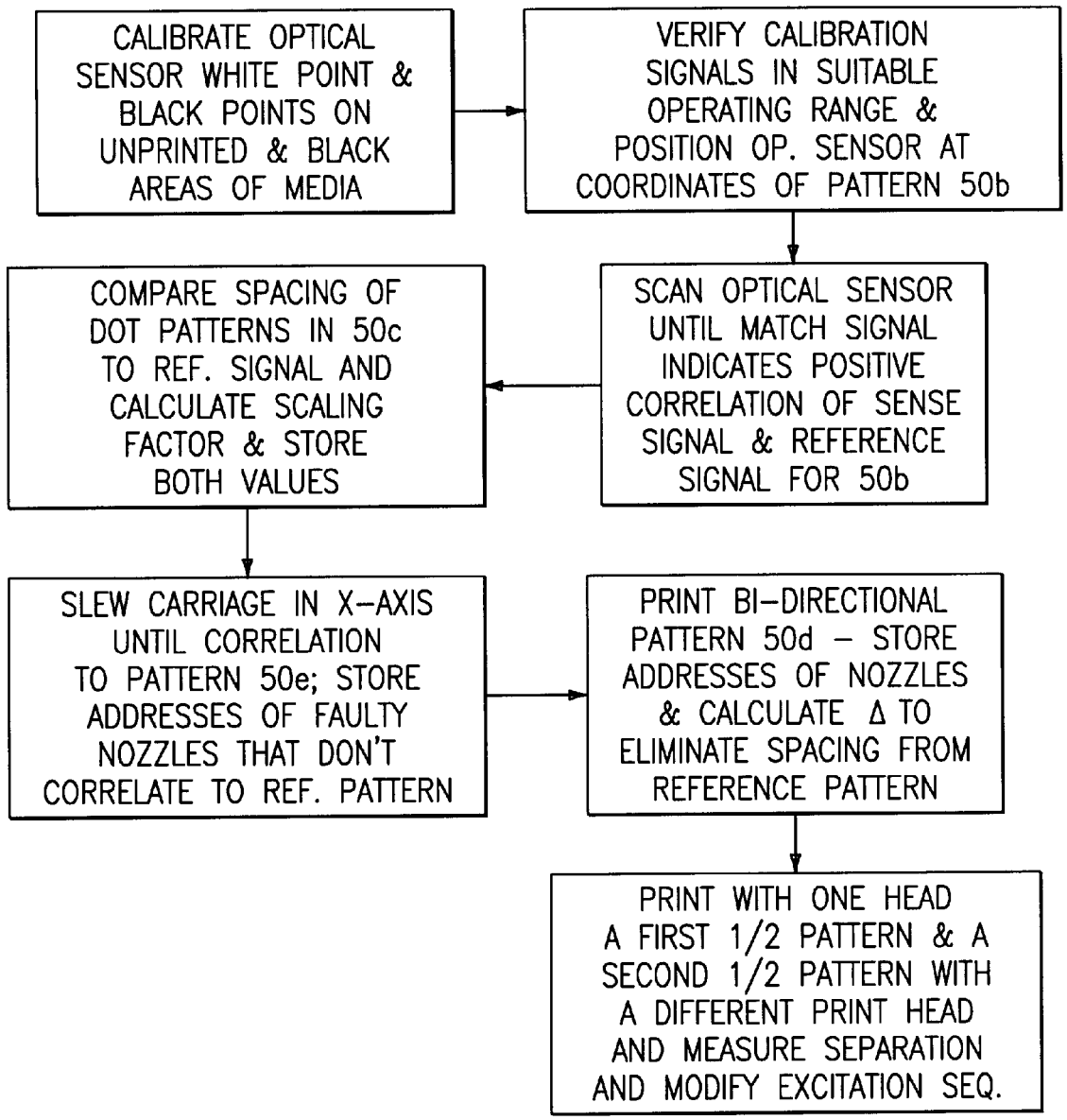
FIG. 10 is a flow chart depicting a preferred sequence for conducting the sets of calibration patterns pursuant to the present invention.

In FIG. 10, a flow chart depicting the sequence of steps of the present invention are illustrated and needs no further discussion. In each said step (the details of which are more fully explained in the written description herein) a previously printed pattern of dots are sensed (sample and hold process for individual sensor images) by the optical sensor 100 until a positive correlation is made between the sensed image pattern of dots and a bitmap reference pattern of dots. When a positive correlation occurs, an output signal from the sensor 100 reaches a maximum value and the positional coordinates of the sensor 100 (using linear encoder and a y-axis direction position signal) is stored in memory. Since each individual dot recorded upon the media was printed to reach a predicted, ascertainable location, the difference between the detected location and the desired location may be calculated for each individual dot. Typically, a variation in dot location along the x-axis direction is compensated with a change to the timing of the excitation pulse used for creating the dot. If a y-axis variation is detected in a "static" pattern such as the fingerprint pattern 50e, the corresponding nozzle is deemed faulty and eliminated from further operation. However, if a y-axis variation is indicated for an entire pattern of dots that are otherwise emitting ink droplets and creating satisfactory recorded dots, as in head-to-head registration pattern 50f, the excitation sequence for the entire pattern is modified to begin printing in a different print swath so that the y-axis variation is eliminated.

In FIG. 11, a hand rendering of a representative bitmap image sensed by sensor 100 is depicted and a portion 152 of said bitmap image is shown enlarged to illustrate an expected resolution of the sensor 100 when viewing individual dots which comprise dot patterns herein. The field of view of sensor 100 is approximately eighty (80) pixels wide by sixty (60) pixels high in a present iteration of the present invention which is adequate for the purposes herein. The inventors recognize, however, that the field of view may be increased arbitrarily by advances in the art as well as needs of certain applications. In one embodiment expressly covered hereby, a sensor 100 having an expanded field of view is fixed to the chassis of the print engine and in conjunction with highly accurate media handling apparatus all the advantages of the teaching of the present invention with respect to traditional swath-type carriage based print engines are realized.

Figure 12:
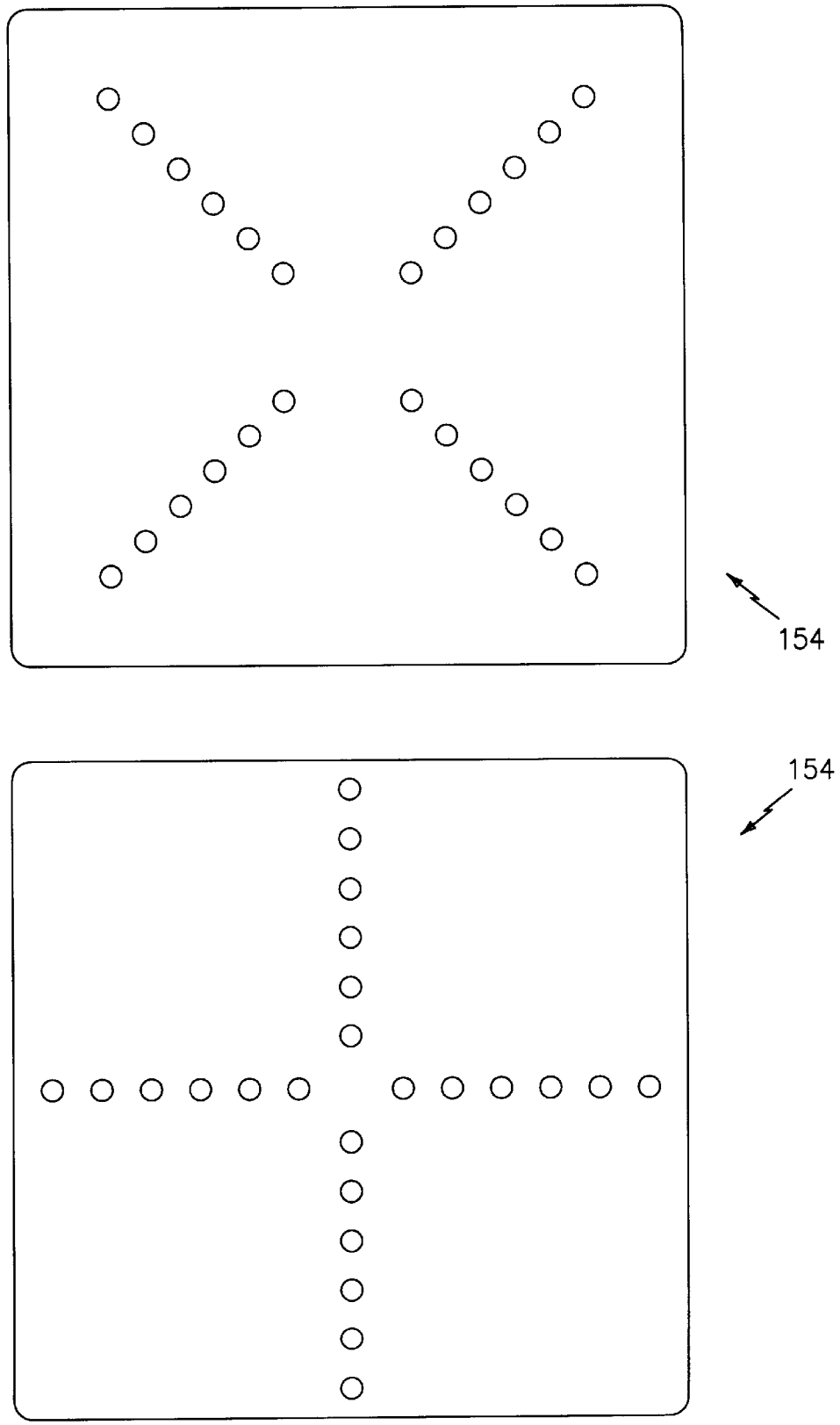
FIG. 12 shows two representative bitmap reference patterns each synthesized from a common specification which common specification is also preferably used to print calibration image patterns on the media.

In FIG. 12, two representative reference patterns 154 are shown that possess appropriate design qualifications for use in improving registration in the bi-directional printing direction. Namely, these two reference patterns 154 share very few common pixel addresses whether or not the two patterns 154 overlap. Thus, the two patterns 154 may be moved and sensed by sensor 100 without appreciable noise from the other of the two patterns. Note that neither of the two patterns 154 have any "center" pixels filled and therefore the likelihood of interference between any reference dot patterns used for both patterns 154 does not occur.

Figure 13:
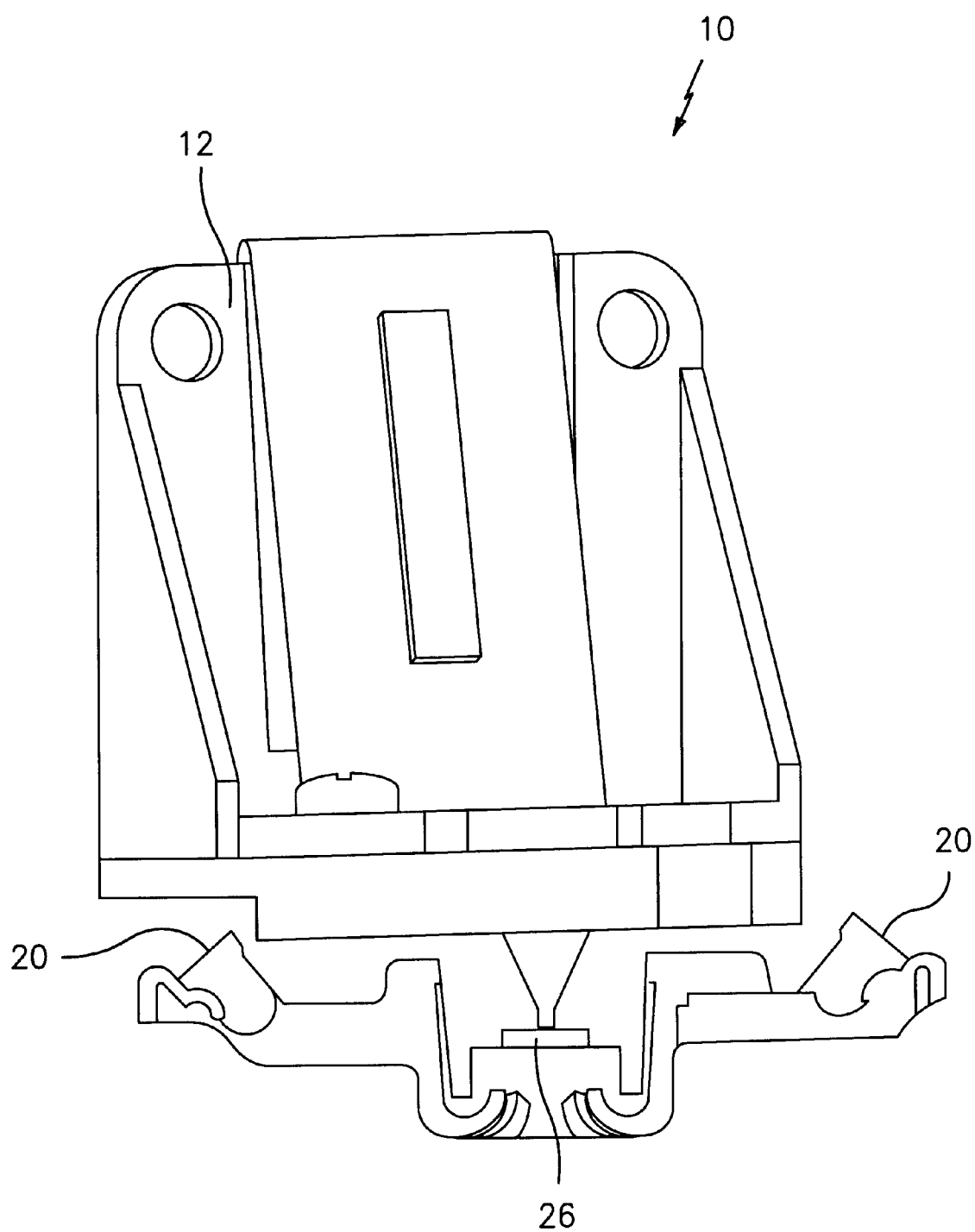
FIG. 13 is a cross-section elevational view of the compact imaging subassembly wherein the orientation of the visible light sources relative to the lens and the imaging array, and an interior light pathway is depicted.

In FIG. 13, which is a perspective view in cross-section with some parts missing, the relationship between the LEDs 20 and the lens 26 and the CCD 100 is illustrated. The finger features of ring 22 which bias the LEDs 20 and the lens 26 into proper orientation so that illumination provided by the LEDs 20 reflects from the media 48 (dotted lines—not drawn to scale) is also clearly discernible in FIG. 13.

Figure 14:
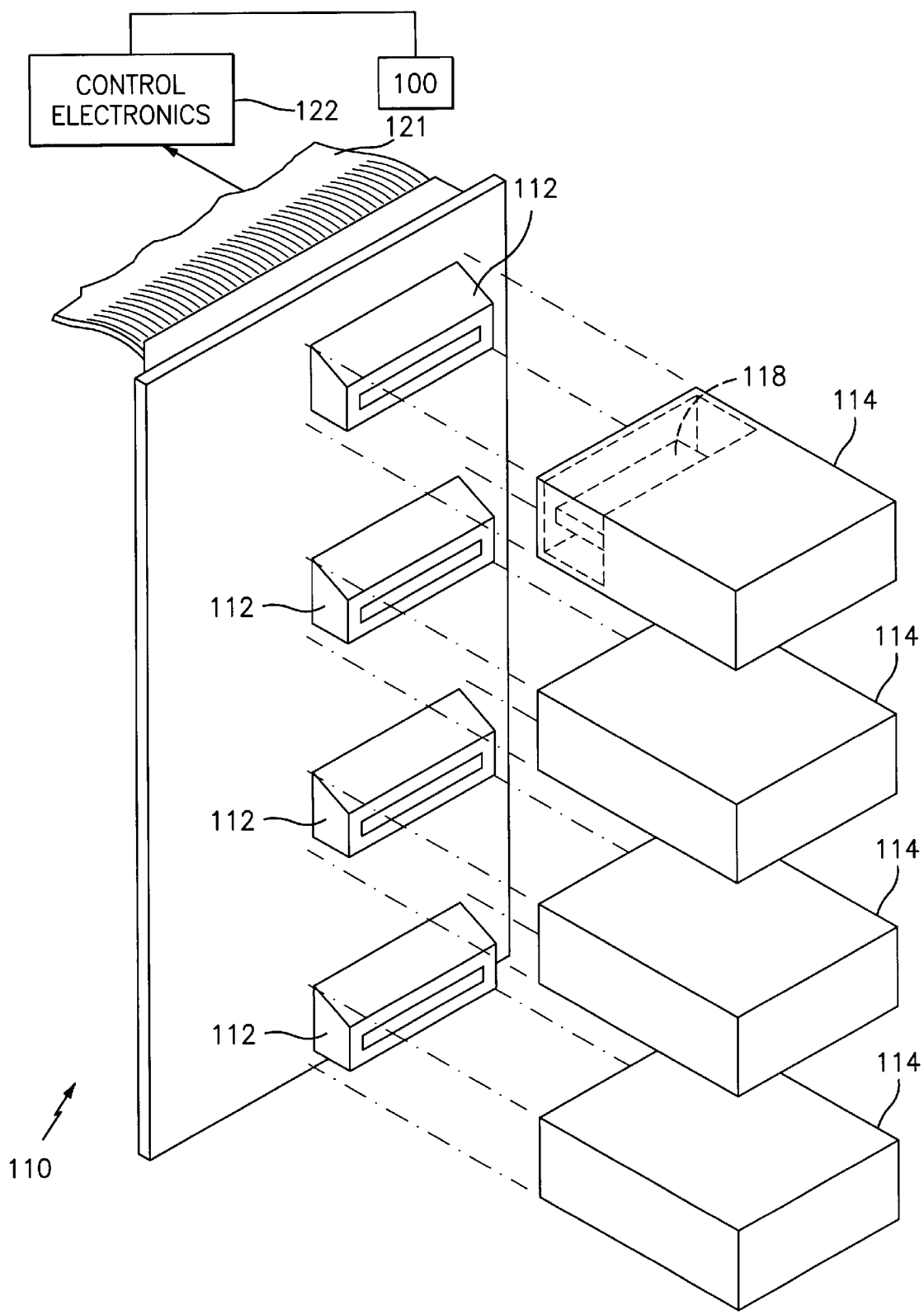
FIG. 14 depicts the electrical connections of a preferred embodiment of the present invention wherein a memory structure containing chromatic information about colorant contained in each ink jet print head is coupled to control electronics which energizes one or more of the visible light sources.

Referring to FIG. 14, a docking station 110 having a number of electrical receptacles 112 formed in a side thereof is adapted to receive a set of data carrier cards 114 each having electrical traces disposed on a substrate, generally indicated at 118 that provides electrical communication between the data carrier cards 114 and the electrical receptacles 112 of the docking station 110. The substrate 118 of the data carrier cards 114 contains at least one memory structure which preferably contains a field of data about chromatic characteristics of ink in an ink jet print head that corresponds to each one of the data carrier cards 114. When the data carrier card is inserted into a receptacle 112 of the docking station 110 and electrical communication is established therebetween via an electrical conduit 121 to control electronics 122 (typically disposed on the carriage mounted circuit board) which then collects the at least one field of data from the memory structure and conveys a control signal to energize an appropriate LED 20 coupled to the imaging subassembly 10. The control electronics 122 takes the field of data and selects the appropriate LED to a energize to best illuminate colored dots on the media so that the CCD 100 can provide a signal related to the precise location of the color dots as earlier described. Thus, the compact imaging subassembly 10 is able to rapidly sense dots having diverse colors (i.e., from any portion of the visible spectrum), and resolve their location so that adjustments to timing, or location, or the dots can be made. In the preferred embodiment wherein the ink jet print heads can each be filled with a different ink color or ink type the level of automation taught herein provides rapid verification of the performance of each nozzle of each print head (thousands of individual nozzles) so that rapid and precise registration can be performed. Furthermore, faulty, mis-firing, or non-firing nozzles can be quickly determined and remedial measures undertaken (or said nozzles can be removed from the jetting sequence used to form large format prints).

Figure 15:
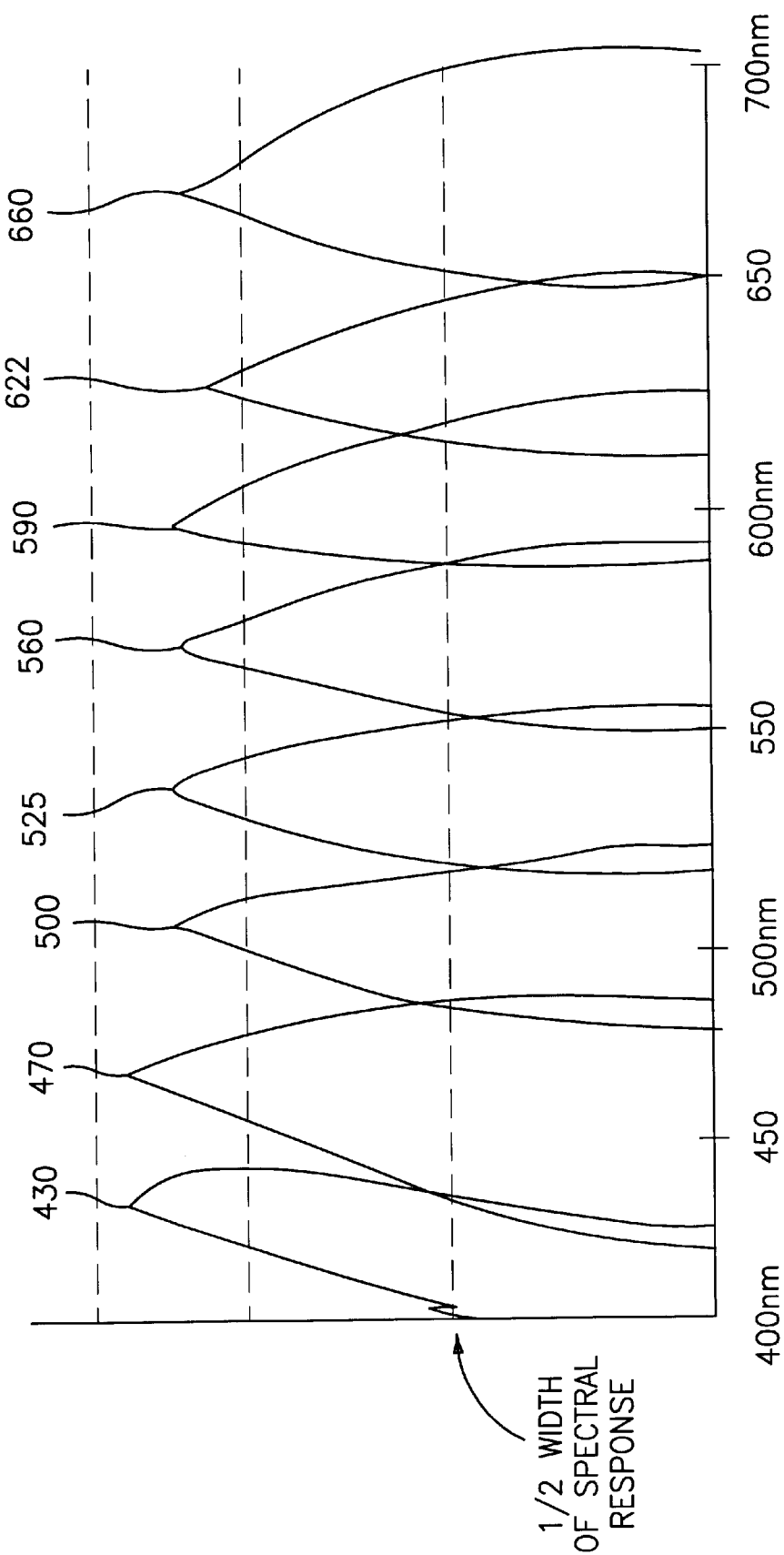
FIG. 15 is a graph depicting an approximation of the emitted radiation from the preferred LEDs used in conjunction with the present invention where in eight different peak wavelengths of radiation are emitted from the LEDs and the LEDs adjacent to other LEDs provides an overlapping amount of radiation among the non-peak wavelengths of radiation so that complete coverage of the entire visible spectrum by the CCD.

Referring now to FIG. 15, a depiction of the radiation spectrums for the exemplary set of LEDs 20 taught herein is presented. Each peak is labeled with the wavelength of the LED which produces the radiation peak and the half width of the spectral response of each said LED 20 is also discernible. The peaks and the overlapping nature of wavelength-adjacent LEDs 20 ensure that no gaps exist where a colored dot might not reflect adequate radiation to be sensed by the CCD 100. The selection of LEDs 20 may be altered and modified to suit various needs, and a number of manufacturers provide fairly complete supplies of the needed components; such as, Siemens AG, Hewlett-Packard Company, and King Bright, to name a few. Furthermore, the selection of appropriate LEDs 20 should include criteria wherein each LED has radiation of magnitude as bright as necessary to keep exposure times relatively short. The preferred set of LEDs have the following wavelengths: 430 nm, 470 nm, 500 nm, 525 nm, 560 nm, 590 nm, 622 nm, and 660 nm. The inventors recognize that if cost were not a factor in bringing this technology to market in lieu of the preferred set of LEDs described above, the invention would utilize thirty-one (31) filters illuminated by white light so that a direct correlation between the detected or sensed colored dots and L*a*b* color space coordinates. Furthermore, in lieu of the CCD array, and the photodiode, or set of photodiodes discussed herein the 'color sensor' could comprise an assembly using while light for illumination and employing a set of high quality filters (having sharp cut-off characteristics), or could comprise any sensor capable of generating a color coordinate signal when directed to one or more colored dots upon a media substrate. Furthermore, a white 'reference target' may be used in certain circumstances where the color sensor requires re-calibration and in cases where the media is non-white.

Figure 21:
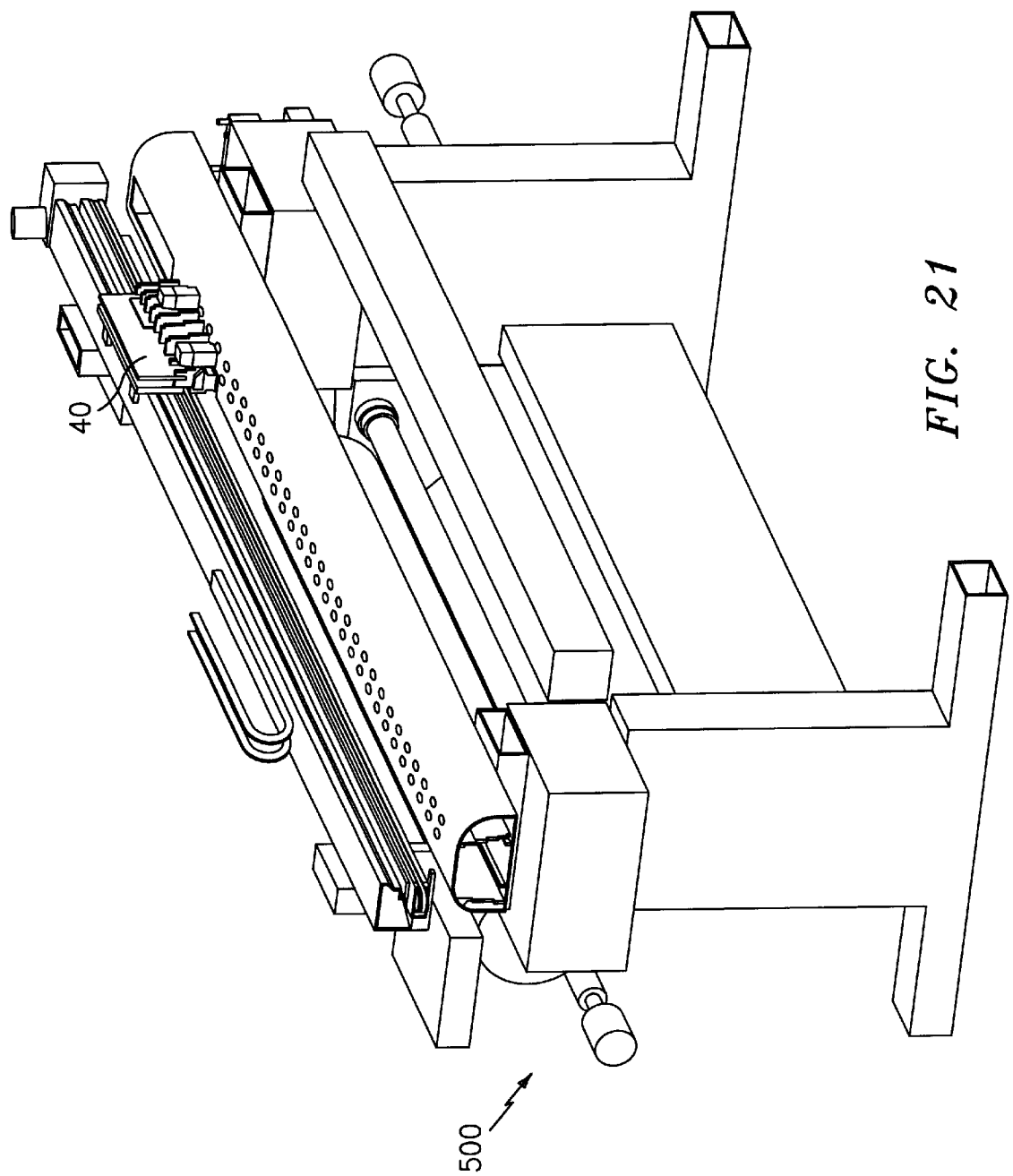
FIG. 21 is a perspective view of a large format print engine described in the exemplary embodiments herein and wherein certain portions of the view are revealed in ghost (or see-through portions) of said large format ink jet print engine.

When installed on a reciprocating carriage assembly 40 of a large format ink jet print engine the LEDs 20, lens 26, and CCD 100 of the subassembly 10 is directed toward the media 48 which moves orthogonally to the reciprocating carriage assembly 40. A large format print engine 500 of the present invention is depicted in FIG. 21. The carriage assembly 40 reciprocates in the x-axis direction typically driven by a belt which couples to a drive motor. In those large format print engines that utilize friction roller/nip roller combinations to move the media back and forth through the printing zone (and the CCD-sensing zone) of the print engine, care must be taken not to print any of the calibration marks in the 'path' of the friction/nip roller footprint or the marks will be smudged, obscured, or 'tracked' over other parts of the media causing difficulty practicing the present invention.

Ink and Media Dependent Color Transform Technique

One way to determine the color of a colored patch is to measure its reflectivity at a sufficient number of narrow wavebands spanning across the visual spectrum. This is usually done by comparing the amount of light reflected by a color patch with that reflected by a white patch. The comparison can be done using the values of electric signals generated by a photosensor such as a photodiode or CCD (which is an array of miniature photodiodes). One difficulty here is that the electric output of most inexpensive photosensors is not sufficiently linear (with respect to the energy of incoming light) to provide data with accuracy suitable for color measurements. Another difficulty lies in the fact that in reality, color swatches produced by the printer are just an assembly of separate or overlapping dots made by drops of just a few different inks. To extract reflectivity from CCD measurements, each CCD pixel output received with certain exposure time 't' is first mapped to the exposure time 'T' that was required to get the same output in the white patch. The reflectivity 'R' is then determined as a ratio of T/t over CCD pixels, $R = <T>/t$.

The term color sensor is intended herein to refer to all manner of sensors that can be used to generate an accurate, set of coordinates for colored dots appearing on a printing substrate. In the preferred embodiment, a CCD array is used with illumination supplied by a suite of LEDs, although as mentioned above, a photodiode disposed next to the CCD of the embodiments depicted herein could be used to readily generate a set of color coordinates for each of a plurality of color patches appearing on the printing substrate. In the exemplary CCD embodiment, each pixel of a 240×324 pixel CCD array (although pixels bounding the periphery of the array are preferably ignored) is read for each single discrete calculation of reflectance herein wherein, in the photodiode example, typically a single multi-bit data signal is created from reflected illumination. In practice, the darkest level pixels area averaged and the average subtracted from each. Thus, the photodiode embodiment, while not present throughout the written disclosure and Figures herein is a most preferred embodiment of the present invention. In particular, use of both a CCD and a photodiode has advantages in operation since the CCD can resolve discrete, single pixel dots and thus readily confirm (or correct) dot placement errors and registration of all print heads while the photodiode is best utilized for 'reading' color patches as described hereinbelow.

Certain information about the ink(s) and media are preferably either known or readily available to the operator of a print engine practicing the present invention. This information includes ink color, ink type (e.g., pigment-based or dye-based), and percent of ink coverage the particular media can withstand. In one embodiment of the present invention, a memory structure containing the ink type and/or ink color is inserted into a docking station that couples to print head control electronics. In another embodiment, this information is provided by an end user manually via a touch pad panel disposed on a surface of the print engine (or is otherwise entered) so that the print head control electronics can utilize the data. Likewise, the percent ink coverage (or optimum coverage) can be provided by a similar detachable memory device which is inserted into a docking station which then couples to print head control electronics or manually entered by the end user. Another technique for determining an appropriate percentage of ink coverage combines aspects of the prior art wherein portions of media receive incrementally more ink over an arbitrary range of possible ink coverage amounts, the ink is allowed to dry (which could be relatively long time under certain conditions) and an operator views the media and manually determines an appropriate value of percent ink coverage for a given ink upon the particular media.

In keeping with the 'theme' or 'motif' of the present invention, the inventors hereof have created several automated techniques for determining an appropriate percent ink coverage. The inventors suggest that a large variety of appropriate techniques for determining appropriate percent ink coverage will be readily ascertainable to those of skill in the art following exposure to the teaching herein. In one such automated technique several patches of ink are spaced on the media by an incrementally greater separation (e.g., one pixel, then two, then three, etc.) and the color sensor is directed to the portions of media between the printed patches. A threshold 'white' value or preferred frequency response (following FFT processing), or correlation pattern to a template, or sets of templates, can then be used to choose the appropriate percentage of ink coverage for the given ink/media combination. Furthermore, a 'gravity assisted drip detector' technique can be used wherein an arbitrary range of ink coverage amounts are printed across a media, and then the media is advanced and then halted so that the patches are suspended more or less parallel to gravity. After a preselected period of time the media is returned to the platen so that the color sensor can inspect the array of percentage ink coverage patches. By aligning the color sensor with the 'lower' edge of the patches so that any sagging, or dripping, patches can be identified. This technique could be iterative with subsequent fine tuning of the percentage of ink coverage, or an arbitrary ink coverage percentage that is between the coverage of the 'sagging' or dripping patches and the next lesser ink coverage patch could be set during subsequent printing.

Once the ink type, ink color, and media ink percentage coverage information is determined or input to print head control electronics, a sequence for forming ink and media-dependent color transforms begins so that a custom transform is created dynamically without resort to additional components, equipment, or manual intervention with the media or printing system. An ink and media dependent transform thus created may be stored, saved, modified, or duplicated following creation, or it may be discarded upon command or when a new media and/or ink substance is loaded on the print engine. The present invention automates techniques and portions of techniques that may have been practiced independently of the present invention and in the case of custom color transform creation a number of commercially available software packages are available to the end user/operator. The details of these systems are independent of their application and use in conjunction with the present invention. For example, ColorTune™ software is available worldwide and is produced by Agfa-Gevaert N.V. of Belgium, another commercially available software package known as MONACOProfiler™ software by Monaco Systems of Andover, Mass., U.S.A. can be used herewith, or ColorBlind™ software by Color Solutions of Cardiff, La., U.S.A. can be easily adapted for use in conjunction herewith. Generally, all these 'transform creating' software packages follow the following steps in creating custom ink and media-dependent transforms (but without the automation provided by the system taught herein). That is, each system first establishes 'linearization' for each print head (ink) with respect to the media; then the optimum ink percentage coverage value must be generated (or provided after empirical testing); then a selection of single, double, triple (and perhaps more) colored ink patches are printed on the media (to create a number of color coordinates between the actual performance of the printer—actual colored dots on the media—and a standard color coordinate system like L*a*b*); and then the colored ink patches are 'read' with an accurate chromatically sensitive instrument and the color coordinates of the patches are read and stored for use in constructing a three-dimensional (3D) color space, or 'color gamut' which is specifically created for the particular ink on the particular media via the particular print head (and the prevailing ambient conditions of a room housing the print engine and to a limited extent taking into consideration the conditions under which the media was subjected or stored.). It is noteworthy that in the case of an ink set having two or more of the same type and color of ink only one (1) of the two or more inks need to be used in creating the ink and media dependent transform.

Figure 20:
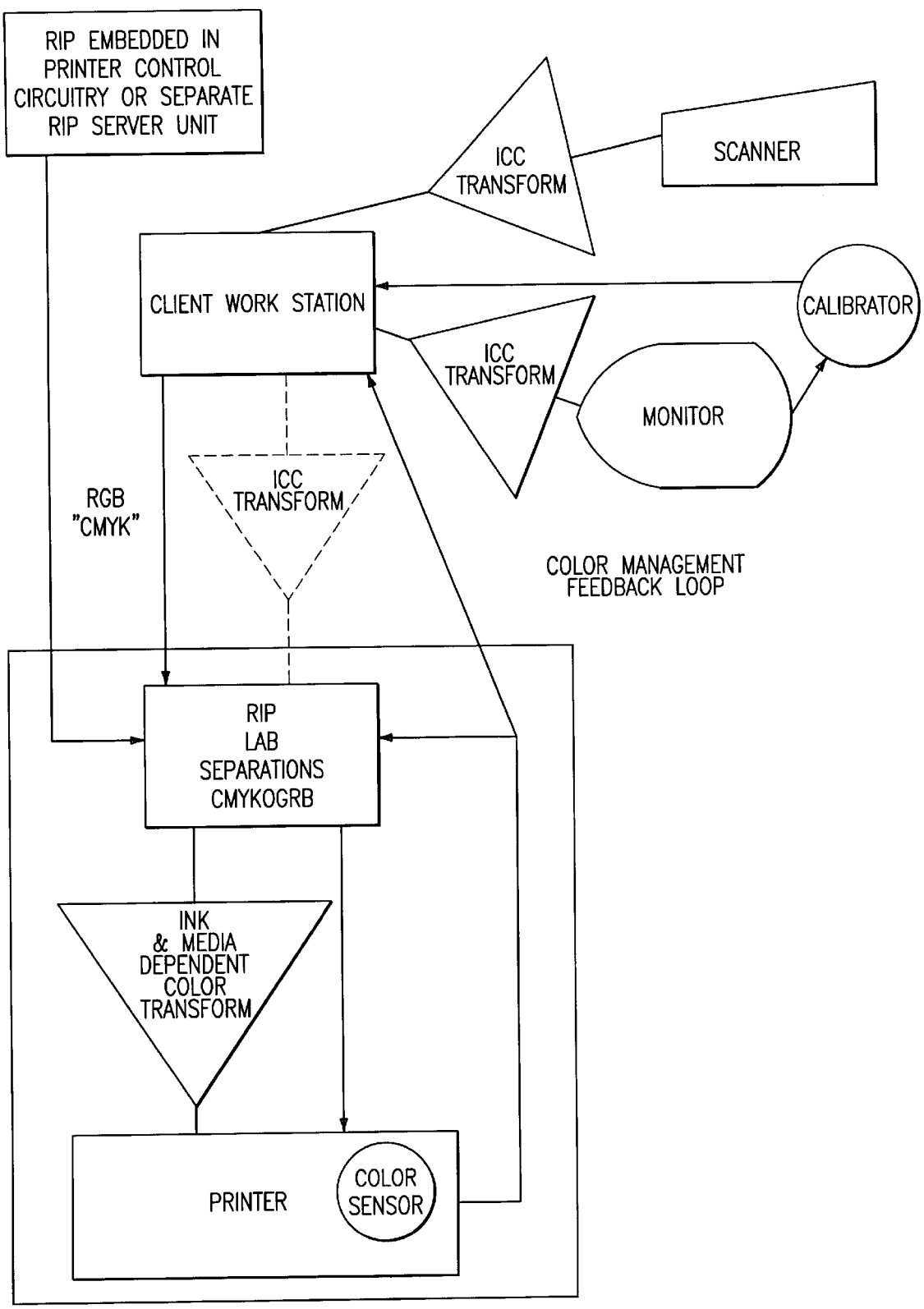
FIG. 20 is a flow chart depicting a work flow wherein a print engine practicing the methods of the present invention may be implemented.

A flow chart depicting the work flow of a print engine practicing the method of the present invention is shown in FIG. 20.

Linearization

Figure 16:
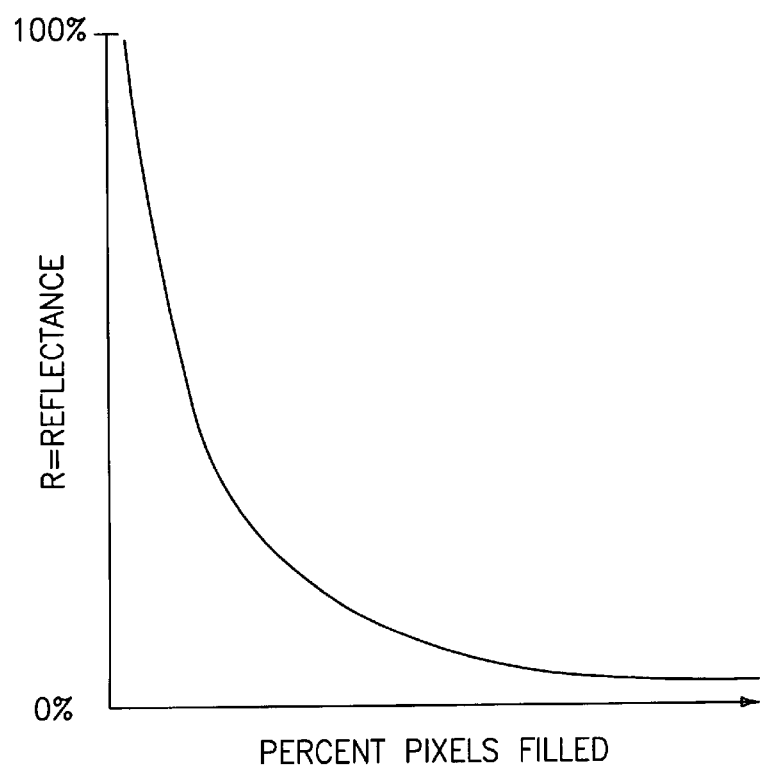
FIG. 16 is a graphical representation of Reflectance (ordinate) versus Percent Pixel Filled (abscissa) which reveals information regarding suitable level of ink coverage upon the surface of a portion of printing substrate.

In this step the actual number of ink droplets per a given printing grid is determined as it relates to reflectance signal values generated by the color sensor. Typically, perhaps sixteen (16) sampling patches per print head are printed. A look up table is created that compares the six sampled patches having different coverage values (e.g., 0%, 15%, 30%, 45%, 60%, 75%, 90%) with reflectance values from the color sensor. Thus, perhaps a 35% reflectance reading for a particular cyan color ink over a 10×10 pixel grid portion might actually require more or less than about sixty percent (60%) of ink pixels to be filled to achieve the nominal 30% reflectance value. Likewise, a seventy-five percent (75%) reflectance reading from the sensor might require more or less than about five (5) out of 100 pixels to be populated with a colored ink droplet. Thus, each ink and each media will often interact such that linearization of the actual printing each unique colored ink on the media is required. A graphical representation of reflectance versus percent pixel filled which reveals information regarding suitable levels of ink coverage upon the surface of a portion of a printing substrate is shown in FIG. 16.

Determining Maximum Percent Ink Coverage

As stated earlier, the value of maximum (or optimum) percent ink coverage can be input to the printing system in at least three (3) ways: first, manually; second; via a detachable memory device which electrically couples to the print head control electronics; and third, empirically determined (and sensed automatically via the color sensor). The first two are essentially self-descriptive (especially in light of the rest of this written description) but the third merits discussion and description herein. As noted above, the maximum percent ink coverage basically provides a global constraint on the aggregate amount of ink that a media will tolerate without creating visible imperfections such as pooling, dripping, cockling, mottling, or blurring of image and text present in a file to be printed. The practiced eye of experienced print engine operators has been long established as adequate in determining an appropriate maximum percent ink coverage but herein automated techniques are presented.

Figure 17:
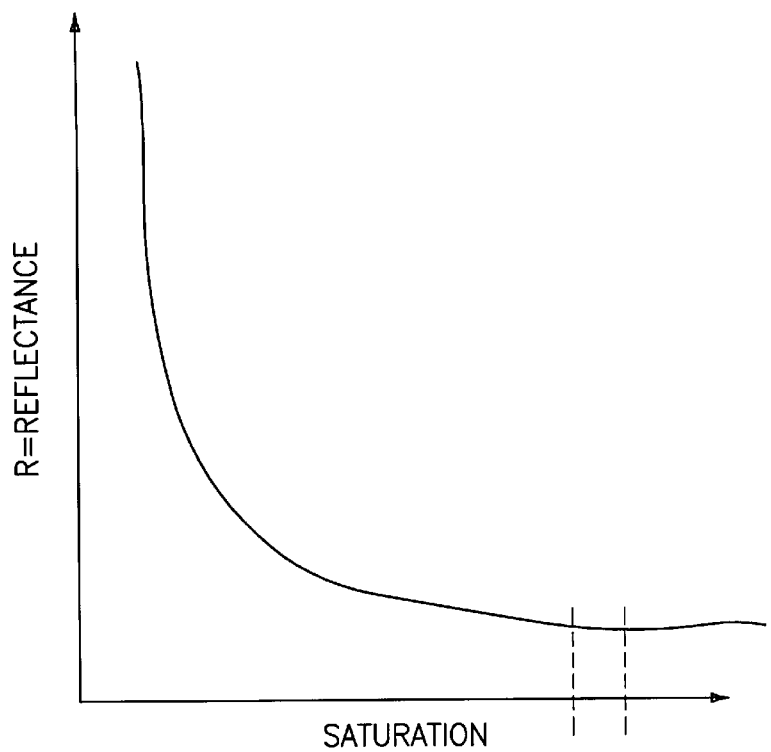
FIG. 17 is a graphical representation of Reflectance (ordinate) versus Saturation (abscissa) which reveals information regarding suitable level of ink coverage upon the surface of a portion of printing substrate.

Such automated techniques involve printing a series of printed patches each having incrementally more percent ink coverage amounts than the previous patch. One technique further includes specific pre-selected spacing between adjacent patches (e.g., 1, 2, 3 pixel separations) which when illuminated and viewed by the color sensor, and subject to analysis (frequency domain analysis or other), will determine which patch is closest to a maximum ink percent coverage. In another technique, the media is advanced so that the portion of the media having the printed patches is inclined, one (or more) static time periods elapse, and the lower portions of the patches are inspected (or re-inspected if more than one period of elapsed time is used) to determine whether the ink dripped, or 'sagged,' thus indicating that too much ink was applied in that particular patch. In another similar method, a single portion of media is printed and the ink dried and then the color sensor is applied to read the values of each successive new 'coat' of ink on the patch. Eventually, the edges of the patch will reveal that the maximum percent ink coverage for the particular media has been reached. A graphical representation of reflectance versus saturation which reveals information regarding suitable levels of ink coverage upon the surface of a portion of a printing substrate is shown in FIG. 17.

Color Patch Printing and Reading the Patches

After determining the color of each ink, and the maximum percent ink coverage, a plurality of color patches composed of single, double, triple, and possibly more distinct ink colors are then printed on the media and the color coordinates of each patch revealed (manually, or with aid of a so-called dedicated 'strip reader' in the prior art). The selection of the ink patches typically accounts for the fact that complementary colors do not make good color pairs since they tend to black in an subtractive ink system (i.e., CMYK) and white in an additive ink system (i.e., RGB). The size of the patches is largely dictated by the field of view of the color sensor so that only the color patch (or dot set) and no unintentionally blank (or colored) portion of media is 'viewed' by and processed as chromatic coordinates. Many techniques for determining how many color patches are required given the number of discretely colored inks comprising an ink set. A default, and preferred value of color patches used in conjunction with the present invention is 928 (with six process colors) although a greater or fewer number can be used with reasonable results. An international standard exists ('IT8') which is used by many color transform software vendors but in the present inventive system the number of patches is not predetermined but can be scaled to suite a particular need. For example, for very high speed, small color gamut printing (e.g., banner printing with only a few colors) with a twelve print head print engine perhaps six print heads will be filled with the dominant color of the banner and two or three other colors used in the banner might occupy the rest of the print heads. Rather than printing over nine hundred patches the present system defaults to a value of less than one hundred patches.

The Examples (8, 9 and 10) appearing below provide another manner of disclosure of the present invention wherein ink color and media characteristics are used in an automated printing system wherein a customized ink and media dependent transform dictates how ink colored ink droplets are applied during printing of images and text.

In the embodiments wherein a photodiode is used in lieu of a CCD array, it should be noted that no lens is required (since we are interested only in the average color of the patch) and that registration will need to be handled in a different manner than when a CCD array is present. Thus the amplified analog output from a photodiode can simply and readily be used to determine the 'color' (coordinates) of a color patch appearing on a media. Most preferably, the photodiode is disposed adjacent to the CCD array in a slightly modified subassembly to that depicted FIGS. 1, 3, 4, 5, and 13 herein.

Figure 18:
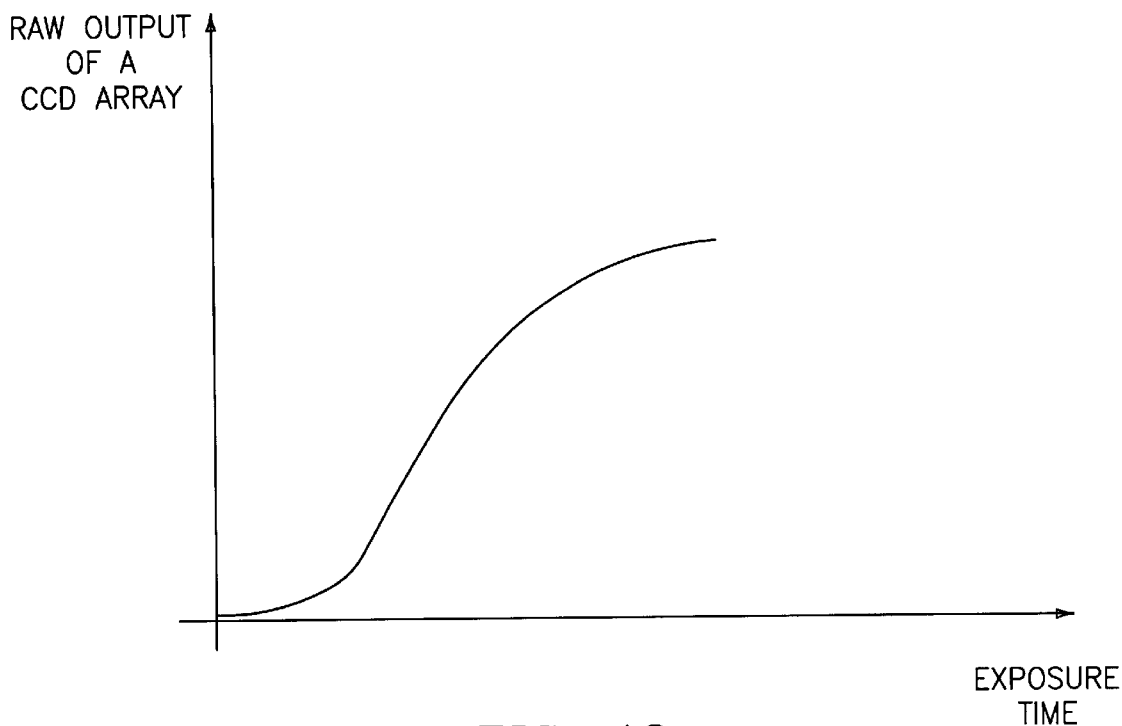
FIG. 18 is a characteristic graphical representation of a CCD response to illumination at different exposure times wherein an output of a CCD after suitable conditioning so that a low value indicates a dark region and the increasing signal denotes more collected light energy for a nonlinear CCD array as taught and described herein.

In the present invention as described in various embodiments, a CCD array illuminated by a selection of LEDs having wavelength peaks in discrete portions of the visible spectrum is used to sense chromatic information. A characteristic graphical representation of a CCD response to illumination at different exposure times is shown in FIG. 18. The inventors hereof believe that this unique, and non-trivial development, merits further discussion and explanation herein although once revealed to one of skill in the art such a 'color sensor' is readily susceptible of complete understanding, and perhaps, insubstantial improvement. One way to determine the color of a colored patch is to measure its reflectivity at a sufficient number of narrow wavebands spanning across the visible spectrum. This is usually done by comparing the amount of light reflected by a color patch with that reflected by a white patch. The comparison can be done using the values of electric signals generated by a photosensor such as a photodiode or CCD (which is an array of miniature photodiodes). One difficulty here is that the electric output of most inexpensive photosensors is not sufficiently linear (with respect to the energy of incoming light) to provide data with accuracy suitable for color measurements. Another difficulty lies in the fact that in reality, color swatches produced by the printer are just an assembly of separate or overlapping dots made by drops of just a few different inks. To extract reflectivity from CCD measurements, each CCD pixel output received with certain exposure time 't' is first mapped to the exposure time 'T' that was required to get the same output in the white patch. The reflectivity 'R' is determined as a ratio of T/t averaged over CCD pixels, that is; $R=<T>/t$.

Figure 19:
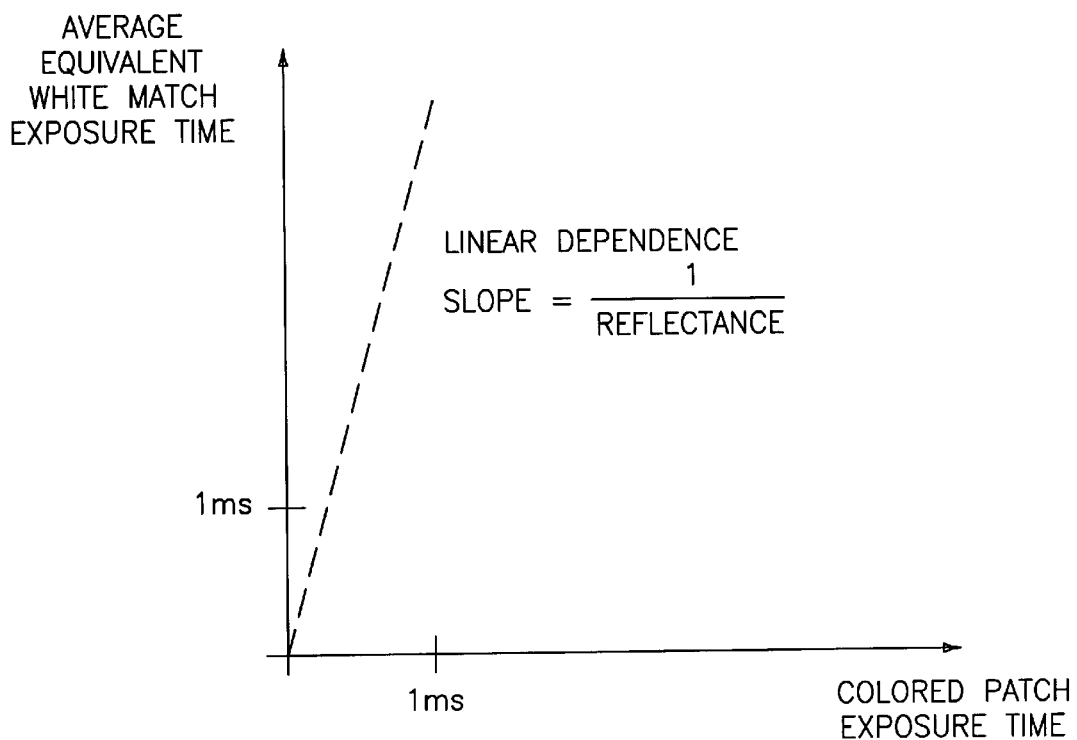
FIG. 19 is a graphical representation showing a linear response curve (having Reflectance as the inverse of the slope of the curve) wherein the ordinate is the quasi-energy (or the averaged equivalent white patch exposure time) and the abscissa is actual exposure time for the colored patch.

The output from the CCD array is a collection of analog voltage signals from each pixel of the array. For reflectance readings the amount of 'energy' reflected from a set of colored dots, and not a voltage signal from a sensor 'viewing' the dots, is needed. To relate the reflected energy to the reflectance value for a given patch the following steps were used. The following assumes that the CCD array was first 'characterized'—typically during manufacture or installation—for performance on the print engine against known reference value(s) provided by a reliable, fully calibrated color sensor. First, the CCD array is calibrated to a 'whitepoint' value to create a CCD "exposure time versus response-on-white" curve for each LED. We collect an image for each patch with each LED, subtract the average dark level, and map each response for a pixel through the response-on-white curve to give us the exposure time this would have taken on a white substrate with each LED (or 'quasi-energy' as depicted in FIG. 19), and average all of these quasi-energy readings across the entire image. We may take multiple exposures on each patch with an LED at different exposure times to reduce errors (especially due to noise). Now we find the slope of these quasi-energies against the time of each exposure for each LED and the inverse of the slope of the line equals the reflectance of the patch for each LED.

In the preferred embodiment, eight reflectance values are used (corresponding to the eight LEDs) and then mapped (i.e., translated directly to $L^*a^*b^*$ coordinates). The inventors recognize that preferably thirty-one (31) reflectance values be used since a mathematical equation that directly relates reflectance to $L^*a^*b^*$ coordinates exists and would then be used in a most efficient and rapid implementation of the present invention.

A preferred embodiment is a non-impact printer that can work in an unattended environment and maintain a high quality output automatically even as print heads change condition. The printer contains a set of print heads, an image collection device ('camera'), and a color-reading means, which may utilize the camera or operate independent of the camera. The camera and color reader are preferably contained along with the print heads on a common support structure (reciprocating trolley or carriage) and may be placed over any printed patches placed on the paper by the print heads (i.e., within the printing zone). The printer can adjust the pixels placed on the page and then create an appropriate ink and media dependent color transform to convert the pixels of an image to be printed to discrete nozzles of the print heads containing the appropriate color ink. The transform can be automatically maintained by linearizing the device by printing sets of 'ramps' of increasing densities, reading them with the color reading means. This can be done between print jobs to thereby confirm/improve performance while not impacting any particular print with adjustments made in the middle of a print job.

With respect to the selection of patches used to create the transform it should be noted that the patch selection and composition can be made with reference to a pending print job (i.e., the dominant colors present in the print job). Furthermore, while the inventors herein present their fully automated large format color ink jet print engine some of the empirically derived information needed to perform the tasks of creating ink and media dependent color transforms can be found in other ways. For example, as noted with regard to maximum ink percent for a media the information may be provided via a portable memory structure that accompanies the media from the manufacturer or converter facility, or an end user could provide the information manually using manufacturing information or other indication of maximum percent ink coverage for a given media. Likewise, while the color (coordinates) of each unique ink color present in a print head may be empirically resolved, a portable memory structure containing such information (and perhaps ink type too) could provide the information to the print head control circuitry or the operator can manually enter same.

The following examples are presented to aid the reader in appreciating the inventive concepts herein as well as the variation in their application in solving the long-standing difficulties in achieving perfect registration between and among a large number of ink emitting elements associated with non-impact print heads. The following methods and apparatus are merely illustrative and do not constrain the claimed subject matter herein whatsoever, which claimed subject matter shall only be limited by the terms of the appended claims.

EXAMPLE 1

A method of successively improving registration among several non-impact print heads operating in a digital print engine having a plurality of light emitting diodes disposed to illuminate a plurality of dots printed on a printing substrate, wherein a single one of said plurality of light emitting diodes is energized that best corresponds to the color of said plurality of dots, comprising the steps of:

printing a variety of test patterns of a plurality of discrete, colored dots upon a media by sequentially energizing each ink emitting element under electronic control in accordance with a pre-selected reference image map;

sensing the presence of the plurality of discrete, colored dots of each test pattern with a charge coupled device that receives light reflected from a single one of a plurality of light emitting diodes which is selected and energized to best illuminate said plurality of discrete, colored dots, so that the position of said test pattern, and the position of each said discrete, colored dot of the test pattern until a positive correlation occurs for a majority of dots of said test pattern and the reference image map;

temporarily storing said position of each said dot of said test pattern in a coordinate table;

comparing said position of each said dot stored in the coordinate table to a corresponding dot from said reference image map and storing a unique address for each said dot that does not favorably compare to its corresponding dot from said reference image map; and adjusting an excitation sequence for each dot to correct for positional error of said dot from the expected location of its corresponding dot in said test pattern.

EXAMPLE 2

An improved apparatus for perfecting registration among a plurality of ink emitting nozzles operating in a carriage-based multi-printhead digital print engine under electronic control, wherein the print engine includes a highly repeatable, reversible paper handling subassembly and a carriage-position resolution capability, the improvement comprising:

a) means for sensing, acquiring, and storing bitmap images of discrete single colored dot patterns printed upon a print media;

b) means for comparing said bitmap images of discrete single colored dot patterns with corresponding bitmap reference patterns and storing positional information regarding individual dots that do not positively correlate;

c) means for adjusting at least one timing variable of an excitation sequence to compensate for each said individual dot that did not positively correlate in step b); and wherein the means for sensing bitmap images is a two-dimensional CCD disposed proximate to a lens which focuses a discrete portion of visible-spectrum light reflected from a single LED which emits colored light having a wavelength (and thus color) which is substantially complementary in color to the color of the discrete single colored dot patterns printed upon the media.

EXAMPLE 3

An apparatus for illuminating, sensing, and transmitting position and performance data regarding jetting performance of thousands of ink emitting nozzles associated with up to twelve individual print heads operating in a large format ink jet print engine, comprising:

an L-shaped base member having an vertical portion adapted to receive a flex circuit termination locations coupled to electrically conducting traces of said flex circuit, and having a horizontal portion adapted to receive an optical sensing assembly which is also electrically coupled to the electrically conducting traces of said flex circuit;

a plurality of light emitting diodes disposed in a ring-shaped retaining member to reflect radiation emitted from said diodes at an angle relative to a printing substrate and electrically coupled to some of the electrically conducting traces of said flex circuit at a second termination location;

a CCD disposed to receive said reflected radiation emitted from said diodes and electrically coupled to some of the conducting traces said flex circuit;

a lens spaced from the CCD to focus said reflected radiation upon a plurality of pixels formed in an upper surface of said CCD;

attachment means for fastening the vertical portion of said L-shaped base member to a circuit board so that the flex circuit is in electrical communication with a control electronics suite associated with said circuit board and for fastening the ring-shaped retaining member, the CCD, the lens, and the second termination location of said flex circuit into a completed subassembly;

wherein the vertical portion of the L-shaped base member is preferably directly fastened in electrical communication to a printed wiring board so that the flex circuit termination locations convey electrical signals between remote control electronics and the plurality of light emitting diodes, the CCD, and a memory structure containing at least one data field related to the chromatic characteristics of a colorant emitted by each one of said up to twelve print heads so that a substantially complementary-colored light emitting diode is energized to best illuminate the printed dots to increase a signal from the CCD.

EXAMPLE 4

A colored dot-reading apparatus for illuminating, sensing, and determining the location of each one of a plurality of colored dots on a printing substrate, comprising:

a base member mechanically attached to a printed wiring board at a first end which in turn is connected to a reciprocating carriage assembly of a large format ink jet print engine so that a second end of said base member is disposed adjacent a printing substrate;

a flex circuit having first mass termination location on one end and a second distributed termination at a second end, wherein said one end is interposed between said first end of the base member and the printing wiring board and said second end is perforated to receive electrical posts;

a plurality of LEDs retained in a ring shape so that each of said plurality of LEDs is disposed at an angle toward the center of said ring shape and wherein a set of electrical posts of each said LED are electrically coupled at the perforated second end of said flex circuit;

a lens disposed at the center of said ring shape and held in place with a plurality of resin-based fingers;

a CCD disposed at a focal length from said lens and also electrically coupled to said flex circuit, a memory device having at least one field containing chromatic data regarding the colorant dispensed from a set of ink jet pens onto said printing media so that a one of said LEDs is energized when said colorant is of a complementary color from the color of the visible spectrum illumination provided by the LED.

EXAMPLE 5

A compact subassembly, disposed on a reciprocating carriage assembly of a large format ink jet print engine for energizing specific LEDs based on the chromatic characteristics of each one of a set of colorants to best illuminate a set of colored dots so that faulty, misfiring, and mis-placed colored dots are eliminated from later printing operations, comprising:
- a set of LEDs which set of LEDs covers the visible spectrum of radiation from about 400 to 700 nanometer wavelength with non-overlapping illumination peaks, wherein said set of LEDs are electrically coupled to a memory location where at least one field contains chromatic information about an ink colorant to be emitted from ink jet nozzles so that a one LED from the set of LEDs is energized that provides a complementary color to the color of a set of colored dots on the printing media;
- a compact retaining assembly for holding the set of LEDs in a circular pattern and disposed so that radiation from the set of LEDs reflects from an adjacent printing media surface to a central location of the circular pattern;
- a CCD disposed at the central location to receive LED radiation reflected from said adjacent printing media and creating a bitmap image of said reflected radiation, wherein the CCD is electrically coupled to remote control electronics for conveying the bitmap image to a control electronics suite which controls ink emitting excitation pulses to the ink jet nozzles.

EXAMPLE 6

An apparatus for rapidly identifying colored dots on a printing substrate so that thousands of individual ink emitting locations can be quickly and accurately registered, comprising:
- a set of colored inks;
- a memory structure containing information about the color of the colored inks coupled to control electronics;
- a set of LEDs each emitting radiation that spans a discrete portion of the visible spectrum when energized disposed within a printing zone of a large format ink jet print engine adjacent a printing media also coupled to control electronics so that a single LED is energized in accordance with the information about the color of the colored inks so that a select one of the set of LEDs is energized and reflects from the surface of the printing media wherein said radiation from said select one LED of the set of LEDs is complementary to the color of said inks;
- a CCD disposed to receive said reflected radiation from each one LED of the se of LEDs and convey a bitmap image of colored dots on the printing media to remote control electronics.

EXAMPLE 7

A CCD sandwich assembly, comprising:
- a first and a second ring-shaped resinous retaining elements;
- a set of at least sixteen LEDs disposed between the first and second elements such that the LEDs are disposed in receiving ports around an interior perimeter of the first ring-shaped resinous retaining element and biased with a resin finger from said second ring-shaped resinous retaining element at approximately forty-five degrees from normal toward the center of said ring-shaped elements;
- a circular flex circuit end having conducting traces corresponding to each set of electrical posts of each of the at least sixteen LEDs;
- a CCD array disposed at the center of said ring-shaped elements, physically retained by a set of fingers formed in said second ring-shaped element, and electrically coupled to a set of conducting traces of said circular flex circuit end;
- an L-shaped based member adapted at a first end to mount the circular flex circuit end, the first and second ring-shaped elements and the CCD, and adapted at a second end to mechanically and physically couple to a printed wiring board so that set of LEDs and the CCD are in communication with a suite of print head control electronics and a memory location containing data regarding the wavelength of light reflected from colored ink droplets emitted from a suite of ink jet printing heads so that a one LED is energized to illuminate colored ink droplets of complementary color from the wavelength of the LED.

EXAMPLE 8

A method of automatically printing a calibrated image using a plurality of print heads to emit a set of colored inks onto a printing substrate, comprising the steps of:
- emitting colored ink onto a substrate to create a discrete independent first set of colored dots on the substrate with a first print head, a second set of colored dots with a second print head, and a third set of colored dots with a third print head, and a fourth set of colored dots with a fourth print head;
- positioning a color device proximate said first, second, third, and fourth set of colored dots,
- determining a maximum percent of ink coverage for the printing substrate;
- gathering a set of reflectance signals for each LED from each said set of colored dots;
- determining a set of color coordinates for each said set of colored dots based on each set reflectance signals corresponding to each set of colored dots;
- printing a plurality of color patches wherein some of said plurality of color patches each comprise a mixture of at least two of said colored dots;
- positioning a color device proximate said plurality of color patches;
- gathering a set of reflectance signals from said plurality of color patches and computing a color coordinate for each patch;
- building a color transform from the color coordinates of the patchess; and
- applying said color transform to a digital image data stream so that for each of a plurality of unique image data locations which correspond to a portion of an image composed of said digital image data stream.

EXAMPLE 9

A method of automatically printing a calibrated image using a plurality of print heads to emit a set of colored inks onto a printing substrate, comprising the steps of:
- receiving a set of chromatic coordinates for each of a plurality of colored inks disposed in at least two ink jet print heads from a memory structure electrically coupled to a printer control processor;
- printing a plurality of color patches wherein some of said plurality of color patches each comprise colored dots that produce a patch of color;
- positioning a color device proximate said plurality of color patches;

gathering a set of reflectance signals from said plurality of color patches and computing a color coordinate for each patch;

building a color transform from the color coordinates of the patches; and applying said color transform to a digital image data stream so that for each of a plurality of unique image data locations which correspond to a portion of an image composed of said digital image data stream.

EXAMPLE 10

A method of automatically printing a calibrated image using a plurality of print heads to emit a set of colored inks onto a printing substrate, comprising the steps of:

receiving a set of chromatic coordinates for each of a plurality of colored inks disposed in at least two ink jet print heads from a memory structure electrically coupled to a printer control processor;

printing a plurality of color patches wherein each of said plurality of color patches each comprise a mixture of at least two different colored dots that produce a color patch of intermediate color;

positioning a color device proximate said plurality of color patches;

gathering a set of reflectance signals from each said plurality of color patches and computing a color coordinate for each color patch;

building a color transform from the color coordinates of each color patch; and applying said color transform to a digital image data stream so that for each of a plurality of unique image data locations which correspond to a portion of an image composed of said digital image data stream.

Although that present invention has been described with reference to discrete embodiments, no such limitation is to be read into the claims as they alone define the metes and bounds of the invention disclosed and enabled herein. One of skill in the art will recognize certain insubstantial modifications, minor substitutions, and slight alterations of the apparatus and method claimed herein, that nonetheless embody the spirit and essence of the claimed invention without departing from the scope of the following claims.

What is claimed is:

1. A method of automatically printing a calibrated image using a plurality of print heads to emit a set of colored inks onto a printing substrate, comprising the steps of:

receiving a set of chromatic coordinates for each of a plurality of colored inks disposed in at least two ink jet print heads from a memory structure electrically coupled to a printer control processor;

acquiring a maximum percent ink coverage for the printing substrate by the steps of:
  printing a plurality of test patches on a printing media, in which the plurality of test patches are spaced apart by incrementally greater separations;
  directing a color sensor to spacings on the media between the printed test patches;
  analyzing the spacings;

printing a plurality of color patches wherein each of said plurality of color patches each comprise a mixture of different colored dots that produce a color patch of intermediate color;

positioning said color sensor to point at said plurality of color patches;

gathering a spectral curve signal, with the color sensor, from each said plurality of color patches to collect a set of reflectance values corresponding to said color patches;

building a color transform from the set of reflectance values and which conforms to the maximum percent ink coverage; and applying said color transform to a digital image data stream for each of a plurality of unique image data locations which correspond to a portion of an image composed of said digital image data stream.

2. The method of claim 1, wherein the color device used during the gathering step is a sensor array.

3. The method of claim 2, further comprising a plurality of LEDs disposed proximate the sensor array for illuminating the print substrate so that such illumination impinges upon and illuminates a set of dots on the printing substrate and said illumination is received by sensor array.

4. The method of claim 3, wherein the plurality of LEDs has the following wavelength values of emitted radiation when energized during the gathering step: 430 mn, 470 nm, 500 nm, 525 nm, 560 nm, 590 nm, 622 nm, and 660 nm.

5. The method of claim 1, wherein the color device used during the gathering step is a photodiode.

6. A method of automatically printing a calibrated image using a plurality of print heads to emit a set of colored inks onto a printing substrate, comprising the steps of:

receiving a set of chromatic coordinates for each of a plurality of colored inks disposed in at least two ink jet print heads from a memory structure electrically coupled to a printer control processor;

acquiring a maximum percent ink coverage value for the printing substrate by the steps of:
  printing a plurality of test patches on a printing media, in which the plurality of test patches are spaced apart by incrementally greater separations;
  directing a color sensor to spacings on the media between the printed test patches;
  analyzing the spacings;

printing a plurality of color patches wherein each of said plurality of color patches each comprise a mixture of at least two different colored dots that produce a color patch of intermediate color and in which the color patch of intermediate color does not exceed the maximum percent ink coverage value;

positioning a color device proximate said plurality of color patches;

gathering a set of reflectance signals from each said plurality of color patches and computing a color coordinate for each of said plurality of color patches;

building a color transform from the color coordinates of the plurality of color patches; and applying said color transform to a digital image data stream for each of a plurality of unique image data locations which correspond to a portion of an image composed of said digital image data stream.

7. The method of claim 6, wherein further comprising the steps of:

printing a set of patches having different percent ink coverage values;

inspecting the set of patches for characteristics indicative of too much ink coverage upon said printing substrate.

8. A method of creating a customized ink and media transform for optimized emission of ink from a plurality of print heads onto a printing surface, the method comprising the steps of:

obtaining chromatic information of the inks in the plurality of print heads;

selecting a desired print ink coverage by the steps of:
  printing a plurality of test patches on a printing media, in which the plurality of test patches are spaced apart by incrementally greater separations;
  directing a color sensor to spacings on the media between the printed test patches;
  analyzing the spacings;
printing a plurality of color patches each of which comprise a mixture of different colored inks;
measuring the reflectivity of, and compiling reflectance values from, the color patches;
building a color transform from the compiled reflectance values; and
applying the color transform to a digital image data stream for each of a plurality of unique image data stream locations which correspond to a portion of an image composed of said digital image data stream.

9. The method as claimed in claim 8, including the step of emitting colored ink onto a substrate to create a discrete independent first set of colored dots on the substrate with a first print head, a second set of colored dots with a second print head, and a third set of colored dots with a third print head, and a fourth set of colored dots with a fourth print head.

10. The method of claim 8, wherein the color sensor used during the gathering step is a monochrome CCD array.

11. The method of claim 10, further comprising a plurality of LEDs disposed proximate the monochrome CCD array for illuminating the print substrate so that such illumination reflects from the printing substrate and is received by said monochrome CCD array.

12. The method of claim 11, wherein the plurality of LEDs has the following peak values of emitted radiation when energized during the gathering step: 430 nm, 470 nm, 500 nm, 525 nm, 560 nm, 590 nm, 622 nm, and 660 nm.

13. The method of claim 8, wherein the color sensor used during the gathering step is a photodiode.

* * * * *

UNITED STATES PATENT AND TRADEMARK OFFICE
CERTIFICATE OF CORRECTION

PATENT NO. : 6,419,340 B1
DATED : July 16, 2002
INVENTOR(S) : Mark H. Wickham et al.

It is certified that error appears in the above-identified patent and that said Letters Patent is hereby corrected as shown below:

<u>Column 28,</u>
Line 8, delete the word "device" and insert -- sensor -- in its place.
Line 17, delete the word "mn" and insert -- nm -- in its place.
Line 19, delete the word "device" and insert -- sensor -- in its place.

Signed and Sealed this

Fifth Day of November, 2002

*Attest:*

JAMES E. ROGAN
*Attesting Officer*     *Director of the United States Patent and Trademark Office*